United States Patent
Hayman et al.

(10) Patent No.: US 6,538,651 B1
(45) Date of Patent: Mar. 25, 2003

(54) PARAMETRIC GEOMETRIC ELEMENT DEFINITION AND GENERATION SYSTEM AND METHOD

(76) Inventors: John Hayman, 701-390 Queen's Qua, Toronto, ON (CA), M5V 3A; Shaun Johansen, 30 Hilsboro Ave., Toronto, ON (CA), M5R I57; Jon-David Lacey, 323 Richmond Street East, Toronto, ON (CA), M5A 4R3; Jay Steele, 1535 Ottonabee Drive, Pickering, ON (CA), L1V 6T5

( * ) Notice: Subject to any disclaimer, the term of this patent is extended or adjusted under 35 U.S.C. 154(b) by 0 days.

(21) Appl. No.: 09/527,477

(22) Filed: Mar. 17, 2000

Related U.S. Application Data
(60) Provisional application No. 60/125,322, filed on Mar. 19, 1999.

(51) Int. Cl.[7] .............................................. G06T 15/00
(52) U.S. Cl. ..................................................... 345/419
(58) Field of Search ................................. 345/419, 420, 345/426, 428, 619, 440, 441, 442, 443

(56) References Cited

U.S. PATENT DOCUMENTS

| | | | |
|---|---|---|---|
| 5,581,672 A | 12/1996 | Letcher, Jr. ................. | 395/120 |
| 5,856,828 A | 1/1999 | Letcher, Jr. ................. | 345/420 |
| 6,014,472 A | * 1/2000 | Minami et al. ............. | 345/426 |

* cited by examiner

Primary Examiner—Phu K. Nguyen
(74) Attorney, Agent, or Firm—Gowling Lafleur Henderson LLP

(57) ABSTRACT

A parametric geometric element definition and generation system and method is described herein. 3D model of geometric objects are generated by execution of one or more directed acyclic graphs having a plurality of nodes which represent various modeling operations and parameters or properties used in defining and generating geometric elements. In further embodiments, an object player monitors modeling operations of nodes and communications with the rendering system to dynamically adapt the performance and format of the rendering system. A notification mechanism is used where nodes may send and/or listen for change events. A modification to one or more properties of node or nodes may trigger the transmission of a change event throughout the directed graph.

47 Claims, 8 Drawing Sheets

PARAMETRIC GEOMETRIC ELEMENT DEFINITION AND GENERATION SYSTEM AND METHOD

This application claims benefit of Provisional Application Ser. No. 60/125,322 filed Mar. 19, 1999.

FIELD OF THE INVENTION

This invention relates to computer graphics and, more specifically to a parametric geometric element definition and generation system.

BACKGROUND OF THE INVENTION

Many applications such as on-line advertisements or promotional graphics require rich image data. As well, better computer graphics capabilities are required by interactive Internet based 3D programming and gaming as well as by real time Internet based simulations. These advanced capabilities are required by advertising agencies, people who create content for the Internet, game developers and entertainment companies. Existing systems are limited because of the large file size associated with graphic, images or image manipulation, the long time required to download content, the lack of rich animatable geometries, the long amount of time required to download level of detail (LOD) data, and the extensive memory and processing time required to generate adaptive level of detail information.

In a computer graphics system, graphic images may be created and/or manipulated by the computer. A graphic image may be displayed on a video display or output to a printer, for example. A graphic image is comprised of a plurality of geometric shapes, or polygons, and textures. As the level of detail increases, the number of polygons and/or textures in the graphic image and, consequently, the size of the image increases. The size of the graphic image affects the time that it takes for the image's display to be updated on the screen as well as the length of time it takes to send the image from one computer to another. It is desirable to be able to minimize the time needed to transmit an image and/or update its display.

A display screen is comprised of a number of horizontal lines (referred to as scan lines) each of which is comprised of a number of dots (or pixels). To update an image on the screen, the area of the screen that contains the image is redisplayed by refreshing each pixel. This is typically performed by starting at the top left corner of the display and ending with the bottom right corner of the display. A complete scan of the display area is referred to as a frame. The number of frames that are displayed per second is referred to as the frame rate. The higher frame rate is typically desirable.

The frame rate is especially important where the graphic image is changed slightly and redisplayed to give the appearance of movement or animation. A low frame rate causes the animation to appear jerky. By lowering the level of detail (e.g., the number of polygons that must be drawn), the frame rate may be increased. However, a lower level of detail may cause the image to appear blocky and unrealistic.

Using existing approaches, each version of the image and/or different levels of detail of each version are created as different images (i.e., different "snapshots" of the image). Before these images may be transmitted to another computer, a data representation of the images must be generated.

One mechanism for generating a data representation of an image is the Virtual Reality Modeling Language (VRML). VRML is a text-based definitional language comprising a statement syntax used to define a graphic image. A VRML file is created to define an image containing VRML statements that define nodes (e.g., sphere, cylinder, cone, cube, translation and transform) and fields (e.g., radius, height, width, and depth) that distinguish one node from another. The following is an example of VRML statements that define a red sphere:

```
Transform {
   translation 301
   children [
      Shape {
         geometry Sphere {radius 2.3}
         appearance Appearance {material Material {
            diffuseColor 100 #Red
         }}
      }
   ]
}
```

The VRML statements identify five nodes (i.e., "Transform", "Shape", "Sphere", "Appearance" and "Material") and fields associated with the nodes. The "Sphere" node identifies a geometric shape (i.e., sphere) and the "radius" field indicates that the sphere is to have a radius of 2.3. The "Appearance" and "Material" nodes affect the way the sphere is drawn. The material node with a "1 0 0" value for its "diffuseColor" field indicates that the sphere is red. The "Shape" node associates the "Appearance" node with the "Sphere" node. The "Translation" node defines a movement of the sphere to a new location as indicated by the "translation" field and its value of "3 0 1". A VRML representation is read and the node and field information is used to generate an image.

A VRML representation of an image represents a static state, or snapshot, of the image. Changes to the level of detail within the image, for example, are done by generating a new VRML representation of the image. Where the sphere is to be displayed on another computer, each of these representations must be sent to the computer before they can be used to display the sphere on the other computer.

The VRML representations of the sphere may be sent via the Internet, for example. Most users connect to the Internet using a modem with a maximum transmission rate that is frequently not achieved due to the quality of the phone line(s) used to transmit the data. The transmission rates using a modem connection are not sufficient to provide continuous streams of image data for processing by a computer. It would be beneficial to be able to the processing capabilities available with existing computer systems and minimize the amount of image data that must be transmitted between computer systems.

U.S. Pat. No. 5,581,672 Dec. 3, 1996 Letcher, Jr. and U.S. Pat. No. 5,856,828, Jan. 5, 1999 Letchter, Jr. describe a system of relational entities for object-oriented computer-aided geometric design. In the patents, geometric objects are defined and constructed in a system which retains and utilizes relationsip and dependencies between objects in a directed graph data structure.

SUMMARY OF THE INVENTION

A parametric geometric element definition and generation system and method is described herein. Embodiments of the invention comprise a model having a plurality of modeling operations and parameters or properties used in defining and generating geometric elements. In one or more embodiments of the invention, the model is a directed acyclic graph of three-dimensional modeling operations that combine to store information about a process used to construct an image. In one or more embodiments of the invention an object player monitors a model, communicates initialization and modifications of geometric data to the rendering system, and provides geometric data to the rendering system in the appropriate data formats.

In one or more embodiments of the invention, the model and modeling operations are object-oriented objects having properties and methods. One embodiment of the invention comprises geometry, core, operation and player object classes.

Geometry object classes comprise the geometric data (e.g. coordinate, color, normal and texture coordinate data). The geometry object allows data to be shared by describing faces as lists of indices into the data pools. Core classes provide the fundamental communication and generation mechanism used by the model and comprise exceptions, change events, and operation superclasses. The operation classes comprise classes that may generate a geometric object or combine geometric objects to create new geometric objects. The object player provides an interface between the model and the underlying rendering system and may initiate a generation request. Geometric object data is returned to the object player in response to a generation request. This geometric object data is then forwarded to the underlying rendering system for rendering the image.

A notification mechanism is used where objects may send and/or listen for change events. A modification to one or more properties of the model and/or modeling operations may trigger the transmission of a change event. The change event indicates to interested parties (e.g., other modeling operations, the model and for the object player) that an update to their geometric output, or other action, may be needed. A tracking mechanism provides the ability to determine what properties have been changed and assists in determining a response to a generate request. Each modeling operation has the ability to respond to a generate request. In an embodiment of the invention, the generation process is a depth-first traversal of the model graph structure. Generation may be limited to those operations of the model whose properties have been modified, and those operations that depend on the modified operation whose properties have been modified.

Different "snapshots" of an image may be generated at runtime by modifying one or more parameters of operations within a model of the image and then asking the graph to generate. Each snapshot may provide a different level of detail or animation, for example. In one embodiment of the invention, a predictive mechanism is used to determine an optimal level of detail.

In one or more embodiments of the invention, a prediction scheme is used to determine the effect on rendering time of image changes. Rendering times are collected and any differences in rendering times between rendering passes are allocated to the changed geometric objects. It is therefore possible to collect statistics on the effect on rendering time of making various changes to the image. It is possible, for example, to predict the rendering times for different levels of detail associated with a geometric object. Predictions may be used in selecting the appropriate level of detail to achieve a desired frame rate.

In accordance with a further aspect, the invention is directed to a method of computer aided 3D modelling of geometric objects undergoing changes wherein a directed acyclic graph is executed to generate a 3D model, the directed acyclic graph including a plurality of nodes which are connected with other nodes with directed edges between two nodes, each node representing a modelling operation of the geometric objects and each directed edge indicating the direction of flow of data from one node to another. The method comprises steps of a first node sending a change event indication specifying changes to bound properties of the node to a series of nodes in succession along associated directed edges and each node in succession determining if the change event indication received from a preceding node affects its bound properties and further determining based on its own rules that its own change event indication should be sent to a succeeding node. The method includes further steps of sending the change event indication to the succeeding node, and last node in succession instructing a rendering system to render a 3D model in accordance with the received change event indication.

In accordance with a yet another aspect, the invention is directed to a method of computer aided 3D modelling of geometric objects undergoing changes wherein a directed acyclic graph is executed to instruct a rendering system to generate a 3D model, the directed acyclic graph including a plurality of nodes which are connected with other nodes with directed edges between two nodes, each node representing a modelling operation of the geometric objects and each directed edge indicating the direction of flow of data from one node to another. The method comprises steps of (a) executing continually the directed acyclic graph to instruct the rendering system to generate a series of frames of a 3D model of geometric objects which are undergoing changes and (b) measuring a time required for the rendering system to generate a predetermined numbers of preceding frames with respect to a target time. The method further includes steps of (c) modifying bound properties of one or more nodes and (d) repeating iteratively steps (b) and (c) so that the time required for the rendering system to generate the most recent frame approach the target time.

According to another aspect, the invention is directed to a computer aided 3D modelling apparatus for modelling 3D models of geometric objects undergoing change which comprises an instruction storage module containing a directed acyclic graph to be executed to generate a 3D model, the directed acyclic graph including a plurality of nodes which are connected with other nodes with directed edges between two nodes, each node representing a modelling operation of the geometric objects and each directed edge indicating the direction of flow of data from one node to another. The apparatus further includes an input port for inputting changes in bound properties, defined below, of one or more nodes, an instruction execution module for executing the directed acyclic graph to generate an output, an object player module for monitoring the output and regenerating the directed acyclic graph in response to the output if needed, and the rendering system for rendering the 3D model of geometric objects in response to the instructions.

BRIEF DESCRIPTION OF ACCOMPANYING DRAWINGS

DETAILED DESCRIPTION OF PREFERRED EMBODIMENTS OF THE INVENTION

A parametric geometric element definition and generation system and method is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

1 Introduction
1.1 Overview

The MetaModel 3D Object Technology describes a 3D model ("MetaModel" or in the plural, "MetaModels") by storing the data needed to create the model, instead of the final model data. Due to lack of proper terminology, "Meta-Model" or "MetaModels" are use throughout this specification to indicate the technology in which the present invention resides and signifies. When a client rendering system receives a MetaModel object, it must execute the Meta-Model to build it. Upon building the object, the object or part of it is displayed on a monitor, printer or other display device. The present invention can be implemented on a client-server system. There are costs and benefits to this approach. The primary cost is the added time required building the MetaModel by the client after receiving the MetaModel description from the server. There are a number of important benefits which are outlined in this document—these benefits far outweigh the costs in a majority of situations; and additionally provide power and functionality that we was previously impossible to achieve with traditional three-dimension graphics technology.

2 Architecture Overview

MetaModel 3D Object Technology can be implemented in Java according to one embodiment. There are, however, many other different platforms in which the present invention can be implemented.

Figure 1:
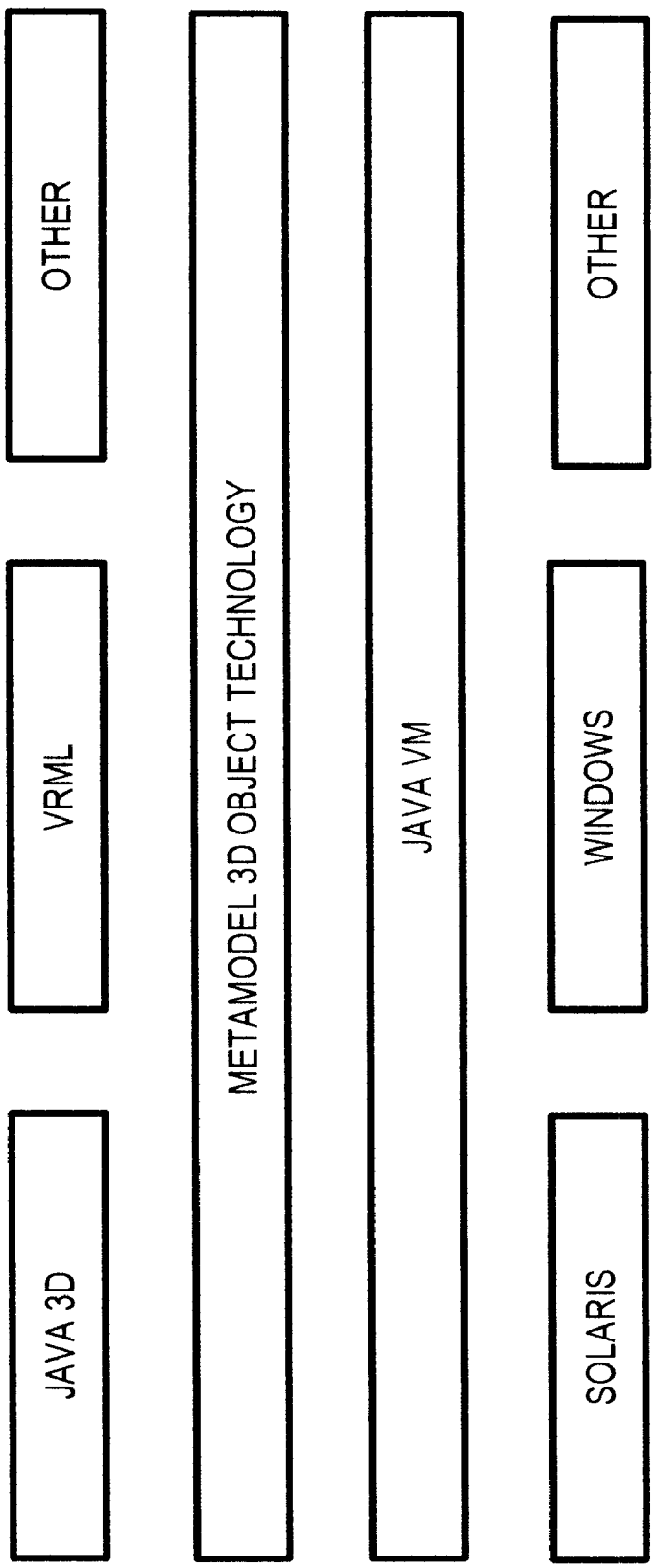
FIG. 1 is a depiction of how MetaModel 3D object technology fits in the world of Java and related 3D APIs.

Referring to FIG. 1, the diagram illustrates how Meta-Models would fit into the Java platform. As seen in the Figure, MetaModels provide a powerful and flexible level between the Java Virtual Machine and rendering engines (or rendering system) such as Java3D, VRML, OpenGL and even platform dependent APIs such as Direct3D.

MetaModels in their Java implementation are JavaBean objects that are executed by a Java Virtual Machine. They are used to build concise descriptions of three-dimensional data that can be efficiently and effectively modified at run-time. Because they are JavaBean objects, they integrate seamlessly into all of the existing JavaBean Integrated Development Environments (IDE).

3 How it Works

Figure 2:
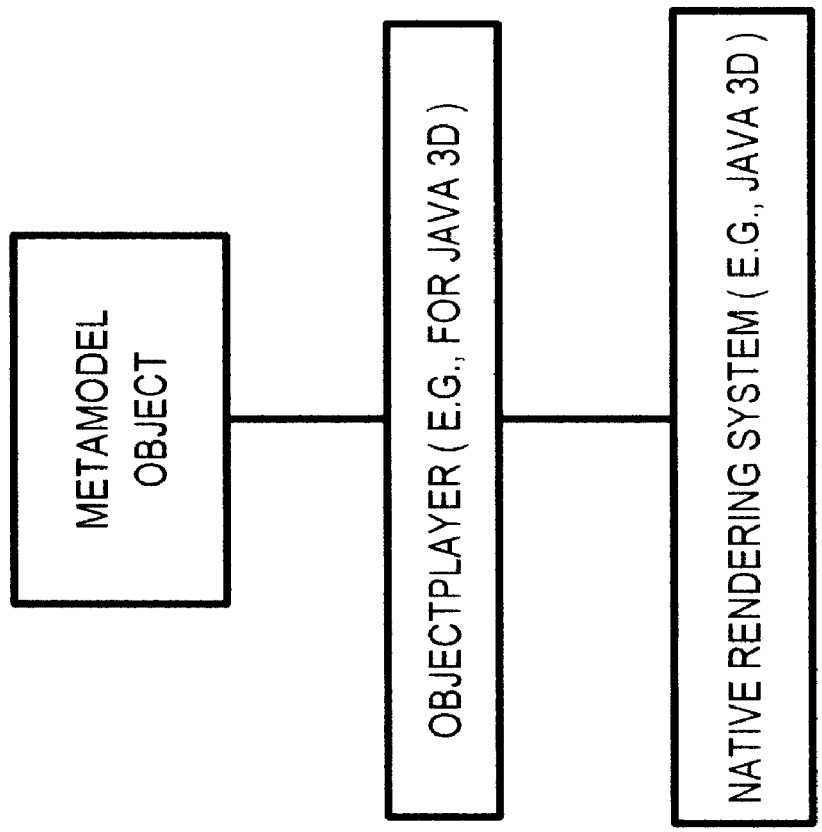
FIG. 2 shows a diagram depicting the flow of information from a MetaModel to a rendering system.

MetaModels work in conjunction with a tiny layer between the MetaModel. API and the native rendering system (Java3D, for example). This intermediate layer is called the MetaModel Object Player. Its primary responsibilities are to monitor a MetaModel object and communicate initialization and modifications of one or more dimensional geometric data to the rendering system, as well as feed three-dimensional data to the native rendering system in the appropriate data formats. FIG. 2 shows the flow of information from a MetaModel to a rendering system.

The benefits of this system are that MetaModels need not know anything about the native rendering system that they are running on. MetaModels can thus be deployed on top of Java3D, VRML, OpenGL, or Direct3D by only rewriting the ObjectPlayer for each platform.

3.1 What is a MetaModel?

A MetaModel is a "directed acyclic graph" of three-dimensional modeling operations. A graph is a system of connected nodes and edges. A directed graph means that the edges have a direction (a source and a destination)—for MetaModels these edges represent the direction of flow of thee dimensional geometric data or other information regarding the node and its status. A directed acyclic graph means that the graph is not permitted to have cycles—that is, a MetaModel operation (e.g., a node in the graph) cannot loop around and become the source for itself (nor any nodes which are built using that node).

Each operation in the graph represents a discrete modeling operation. For example, the first node in the MetaModel graph could represent a user-input polygon. The second node in the graph could interpolate a spline over that polygon. A third node in the graph could represent an extrusion of a circular profile along that spline. The final result is a twisted tube-like structure.

Since the MetaModel always knows how to build itself from scratch, the architecture of the technology allows any propreties in the graph to be modified, thereby potentially modifying the final resulting geometric object. In the above example, one could translate elements in the original modeled polygon, which would in turn force the spline curve to re-interpolate, which would in turn force the extrusion to recalculate. The tube-like geometry would appear to bend, twist and deform as properties in any part of the MetaModel graph are modified.

It should be noted that 3D modeling and modeling operations are for building representations of three dimensional objects and encompass any instructions such as graphical programming language or programming of images that can be visualized on two dimensional displays, holographically, through virtual reality headsets and other display technologies. Alternatively, the models do not need to be visualized but instead could be used for purposes of computation, and simulation. Because MetaModels is described in its Java implementation in accordance with preferred embodiments, many terminologies are borrowed from Java. Nodes and their bound properties resembles JavaBean objects and their properties, events and methods. In Java environment, beans communicates with each other through the use of properties, which are "named attributes(s)" associated with a bean that can be read or written calling appropriate methods on the bean. Typically, a bean exposes its state through its public properties. A property is declared by matched get and set methods. When a property changes that is or may be relevant to another node in the graph, a bean can generate a PropertyChangeEvent describing the change, and deliver it to registered listeners or dependent nodes in the graph. A property that fires such an event is called a "bound property", because its value can be bound to a property of another object. In the present specification, similar meanings are applied to "nodes" and "their bound properties".

In summary, a MetaModel is a graph of MetaModel operations that combine to store information on how a three-dimensional model is constructed.

MetaModel operations are performed by one or more computer systems which contain processing modules for executing a variety of operations which are specified by one or more graphs stored in storage module. The output of executed graphs drives the rendering system to generate 3D model of geometric objects.

Although the specification refers to 3D modeling of geometric objects, such object include, for the purpose of this specification, any object or phenomenon which can manifest itself in three dimensions including audio, or real physical objects or objects of phenomenon existing in dimensions other than three such as 2D imagery.

3.2 The Mechanics

Making the system function at acceptable performance levels is a very challenging problem. The fundamental premise of this solution is the following: Making modifications to large sets of three-dimensional data is extremely computationally expensive, so it is of the utmost importance to minimize the amount of calculations required. Because of the pattern-based nature of the MetaModel model building process, many optimizations are possible given knowledge of what is being modified in the graph, and how geometric patterns of individual MetaModel operations can exploit their very nature to avoid excessive computation.

The following design assumptions were made during design of the architecture of the system:

1. A "close to the metal" access to geometric data would be provided (forfeiting traditional good object-oriented design principles) to ensure that individual MetaModel operations would be able to optimize creation of their output in whatever way was best for them.
2. The computationally expensive part of a MetaModel graph update is assumed to be the generation of the three-dimensional data, and the communication mechanism used to determine what needs to be updated is negligible;

3.2.1 Generation

A MetaModel graph performs a geometric generation when instructed to by calling the generate( ) method. Modifications to the bound properties (properties and bound properties are used synonymously) of graph nodes does not by itself trigger geometric regeneration, but instead provides notification to interested parties (such as the MetaModel Object Player) that updates are required.

The generation process is a depth-first traversal of the MetaModel graph structure, with updating occurring with every node visited. This process ensures that "earlier" nodes in the graph (nodes that contain dependent information) will be updated first. Generation does not need to touch every node in the graph, only the critical pats which lead to modifications in the operation properties.

3.2.2 Modifying the Graph

Modifications to the graph may be made in one of two ways:

1. By modifying any bound property of any of the operation nodes in the graph. In this case, the MetaModel operation can intelligently determine what needs to be changed in the geometry. For example, if the radius property of an Ellipse operation is modified, then the operation can simply update the locations of all of the points in the Ellipse (and it doesn't need to touch the structure, colors, normals, or texture coordinates). When a bound property of a MetaModel operation is modified, an OperationChangeEvent event cascade is generated which ultimately notifies interested parties (such as the MetaModel OtjectPlayer) that the graph is out of synch with its data and needs to be updated.
2. By directly modifying the data in a Model node. Only the Model node provides external access to the Geometry data. This means that individual points and faces can be moved, rearranged or totally destroyed outside of the MetaModel communication model. As a consequence, the MetaModel node does not adhere to the normal communication paradigm of other MetaModelComponents: For example, it does not request that its ancestors generate( ) when it is asked to generate( ), it does not cascade OpeationChangeEvents, and it serializes the Geometry data it contains (Geometry data is transient in all other MetaModelComponents).

3.2.3 PropertyChangeEvents and OperationChangeEvents

When bound properties of a MetaModel operation are modified, a PropertyChangeEvent is fired. Each MetaModel operation listens to its own property change events and fires an OperationChangeEvent. This OperationChangeEvent contains information about the node in the graph that was modified, the property that was modified, and the old and new value of the modified property. The OperationChangeEvents are continually fired throughout the dependent hierarchy of the portion of the graph that was modified until the ultimate OperationChangeListener (the MetaModel ObjectPlayer, for example) catches the event and chooses to regenerate the out-of-date portions of the graph.

Figure 3:
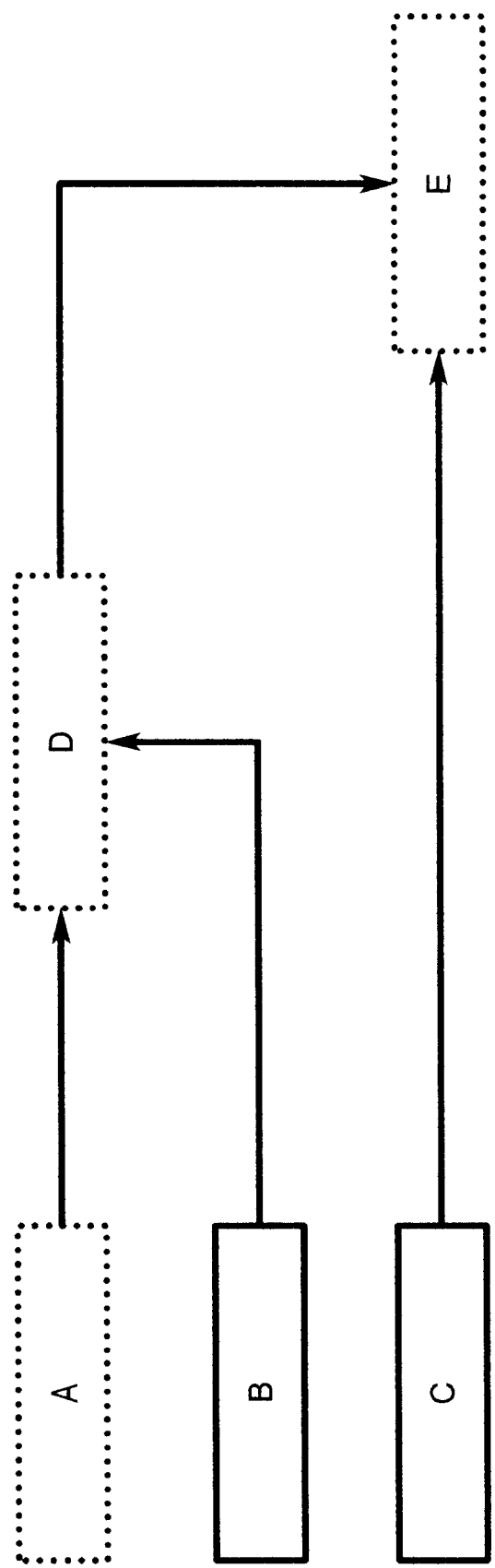
FIG. 3 depicts simple MetaModel operations showing the dirty operations after a modification occurs to a property of MetaModel operation labeled "A".

Referring to FIG. 3, we can see that if we make a modification to a property in the MetaModel operation labeled "A", an OperationChangeEvent will be fired and caught by MetaModel operation "D". The modification is performed by inputting new data or signal to the input port of the node of interest. The OperationChangeEvent may then be generated by D and transmitted to "E". Similarly "E" refires the event which is probably caught by the Object-Player and processed which may result in a change in the displayed graphic images. The dirty operations (to be described later) are indicated with dashed borders. The arrows represent the operation inputs.

FIGS. 4–7 show these operations in more detail. As described earlier, "Node" means an object that may be either deterministic or random and that is used in the generation of graphical images. Examples of nodes are polygon, spline, ellipse, extrude, resurface. Nodes may also be random, such as a jitter node. "Change Event" means a change to a state of a node that when propagated through the directed acyclic graph may affect what is displayed on the display device.

Figure 4:
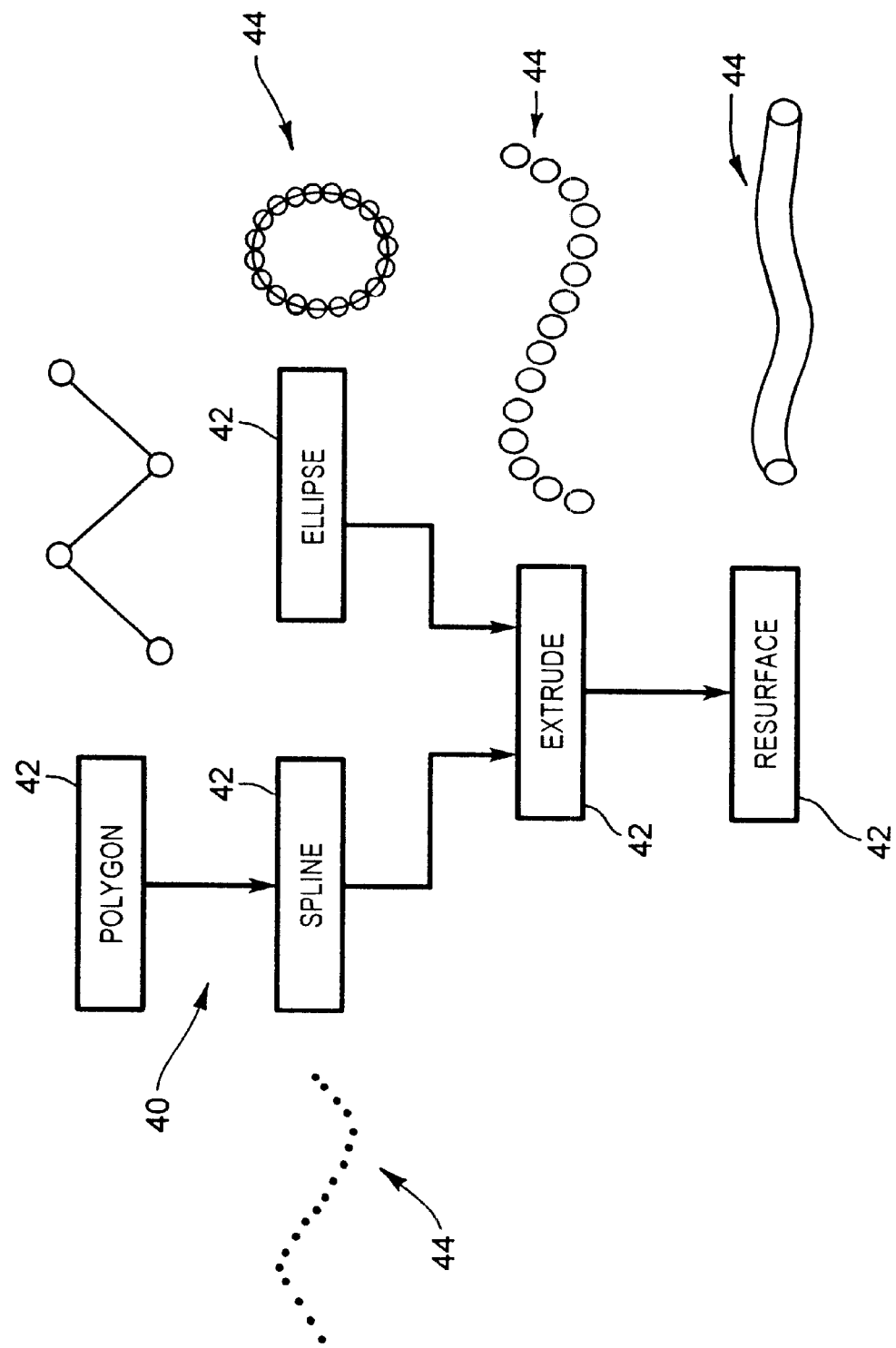
FIGS. 4, 5 and 6 show a directed graph with nodes of sample MetaModel operations. The Figures also show images generated by nodes.

Referring to FIG. 4, a directed graph 40 of five nodes 42 is shown. The Figure also shows images 44 generated by nodes at corresponding locations. If, for example, there is a modification at node "Polygon", the information that a vertices changed could be propagated down through a series of supported nodes. A node at any level in the chain could use the information to optimize its behaviour. Each node makes an evaluation upon receiving a change event as to whether its output will change. If it does not, it does not generate its own change event. If it does, a PropertyChangeEvent is fired.

Figure 5:
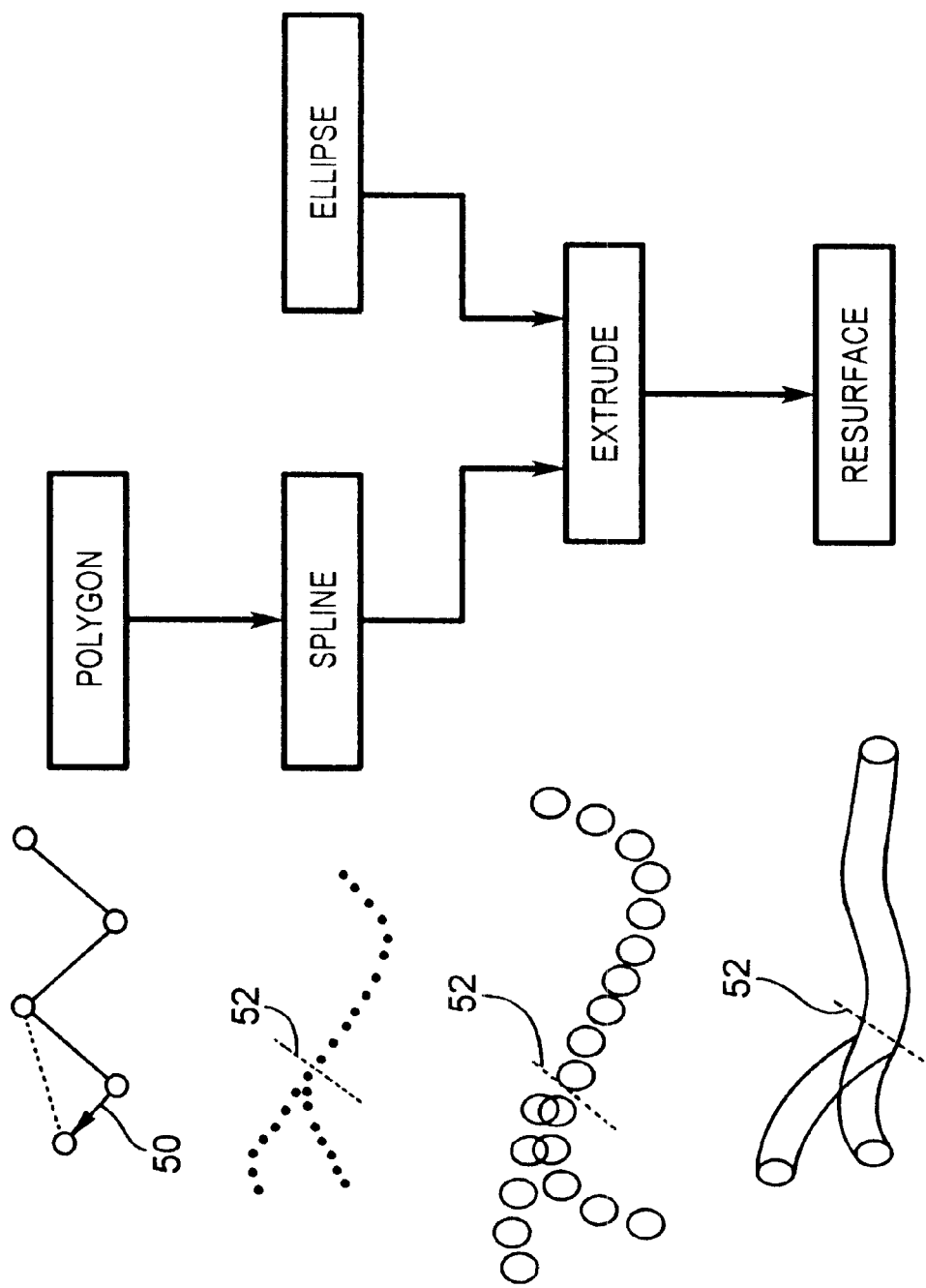

As shown in FIG. 5, if one point 50 on original polygon is moved as indicated by an arrow, the L-spline is equipped with rules, telling it that only a subset of subsequent operators need to be recalculated e.g. only two points between two vertices need be recalculated. This applies to all the dependent nodes such as "Spline", "Extrude" and "Resurface" as shown by dotted lines 52.

Figure 6:
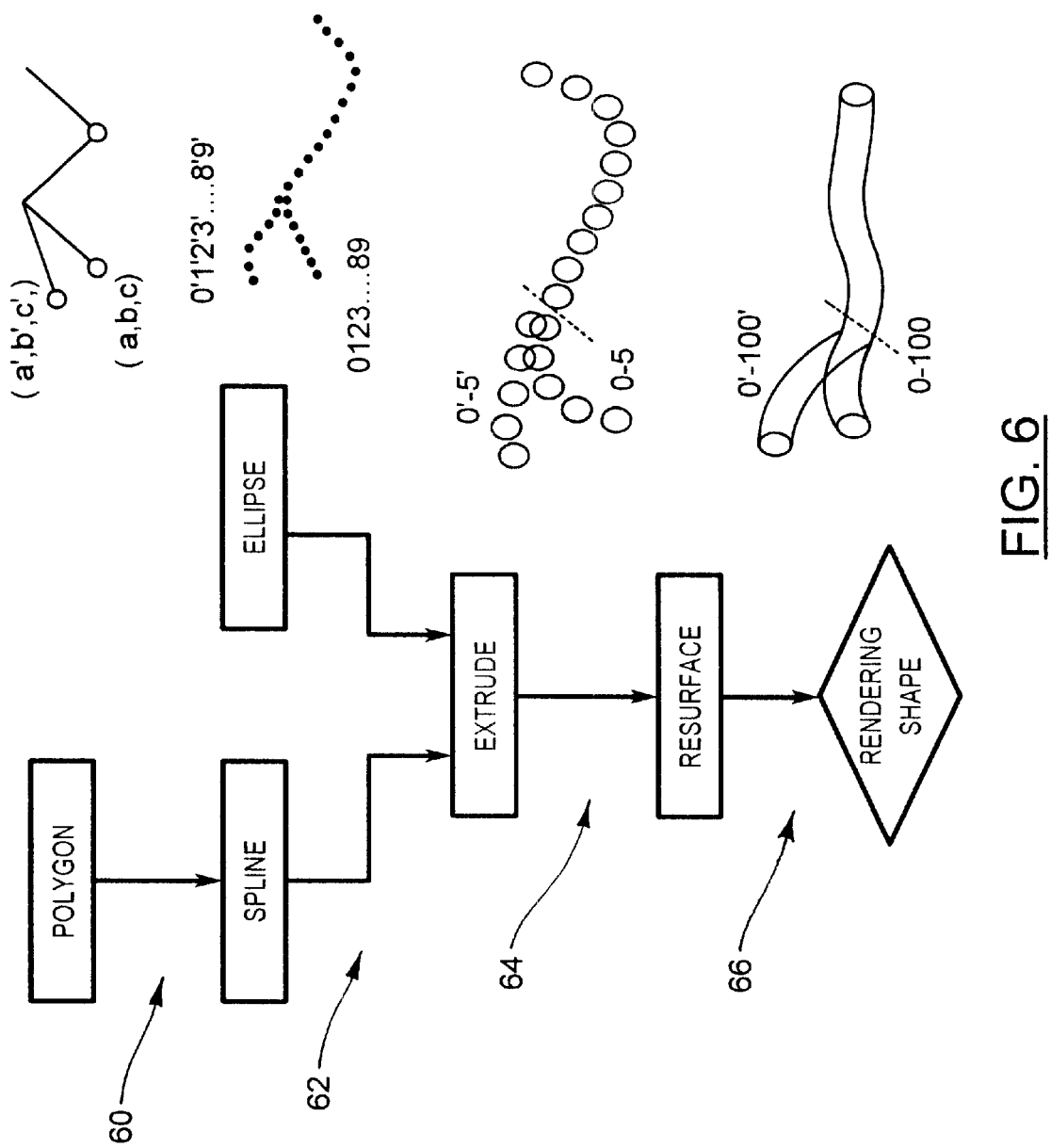

FIG. 6 shows a similar example of FIG. 5 in which at 60 vertex 0 moved from (a, b, c) to (a', b', c') and then at 62 vertices 0–9 moved 0'–9'. At 64, polygon 0–5 changed position to 0'–5'. At 66 face 0–100 changed to 0'–100' with respect to location, shape, size but possibly not topology. The fact that these do not change topology may provide a significant reduction in calculation as there is an exponential increase in data required from node to node.

In accordance with a further embodiment, change events can be multi-threaded. In this case, the supported node needs flags and semaphores to ensure proper order of change event queuing. Different portions of the graph can be allocated to different threads for execution. The threads would communicate synchronously through the use of semaphores or other methods such as reference counters but would operate asynchronously.

Different threads could have different priority (this would require more thread priority granularity than currently exists in Java threads). Threads could be assigned lower priority if, for example, a character was turned away, at the edge of a scene etc. This is analogous to level of detail but a different approach, namely partitioning the executors of the graph into separately executed parts using multiple threads. Alternatively, the multiple threads could be implemented on a multi-processor implementation. This would apply to very high end implementations—e.g. high end animations.

Figure 7:
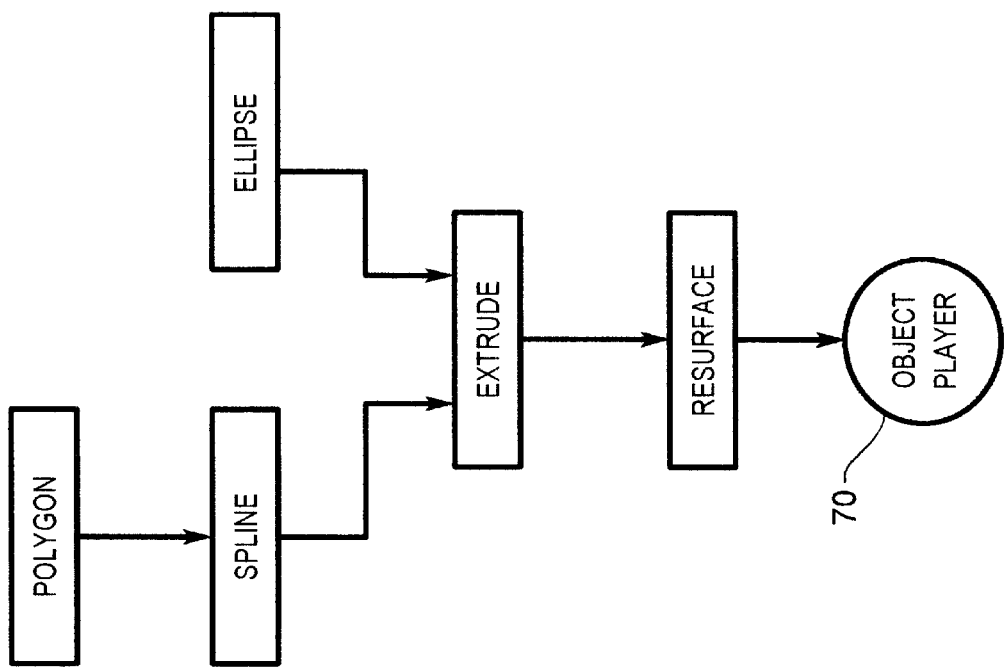
FIG. 7 illustrates a similar directed graph with an object player.

In FIG. 7, an object player 70 is shown. When a dependent node, such as ellipse changes its data it does not necessarily recalculate the data and send it to all the other nodes such as extrude and resurface. The reasons for this are that (i) the object player will ultimately determine what changes need to be perceived by the end user (for example if a particular surface of an object is, at a point in time, turned away from the end-user, changes affecting that surface would not have to be rendered at that instant because they would not be perceived by the end-user; (ii) the second reason is that not all changes in a dependent node will result in changes in the supported node.

Thus, the system transmits information from node to node about prospective changes. This information about prospective changes is evaluated by supported nodes. The supported node can determine whether the prospective change would in turn affect its output. If not, it does nothing. If it would affect its output, it sends a message to its supported nodes, who repeat the process. This is repeated until the nodes that support the object player send messages regarding prospective changes, if any, to the object player. The object player could (i) trigger a depth first recalculation of (ii) evaluate the messages regarding prospective changes against some threshold to determine whether depth-first recalculation should be triggered.

3.2.4 Batch Processing PropertyChangeEvents

Sometimes it is desirable to make several property modifications to a MetaModel operation without firing OperationChangeEvents, since usually the entire MetaModel will be told to regenerate when the ultimate OperationChangeListener receives an OperationChangeEvent. To prevent the graph from updating on every property change, the MetaModel operation can be put in batch mode. OperationChangeEvents will not fire until the MetaModel operation is taken out of batch mode.

3.2.5 PropertyChangeEvent Queue

When bound properties in a MetaModel operation are modified, the PropertyChangeEvent that is fired is enqueued and stored in the operation so that it can be analyzed when the generate( ) method is called. Knowing which property has been modified allows the operation to the important assumptions that can vastly improve performance. Because operations can be put in batch mode, it is possible that numerous PropertyChangeEveats may be fired before an operation is asked to generate.

The PropertyChangeEvents are passed in an array to the generate method, or may be made available to the generate method in other ways such as storing them as a class variable.

3.2.6 Dirty Flags (Semaphores)

When a property is modified in a MetaModel operation or when a MetaModel operation receives an OperationChangeEvent, it is marked as dirty. This dirtiness property indicates to the generate method of MetaModel operation that the output geometry of the Operation needs to be rebuilt. In FIG. 3 the operations labeled "A", "D" and "E" have been marked dirty: this is because a modification of a property occurred at Operation "A". When an operation or node is marked dirty this is also known as setting a semaphore. Note, however, that these different types of semaphore, and the dirty flag semaphore are different than the semaphores required for multi-threading.

3.2.7 Tracking GeometryChanges Using ChangeData

When regenerating, it is extremely valuable for an operation to know how its source operations have modified their geometry. When an operation is modifying its geometric data, it is responsible for storing information on what it has modified. The changeData is an unbound property of MetaModel operation which stores this information between calls to its generate method. Change data, for example, stores information on elements being inserted, removed, or modified in any of th coord, color, normal, texCoord, coordIndex, colorIndex, normalIndex or texCoordIndex properties.

3.2.8 Geometry Hints

Geometry hints are a way for MetaModel operation to look at an incoming Geometry and respond to hints provided to it from other MetaModel operations. For example, a hint could be added to a Geometry that states that the Geometry is already triangulated. Or a hint could be added to a Geometry that gives its coordinate connectivity, calculated from a previous operation. Hints can be valuable in saving extra computation, but there are a number of rules regulating their existence:

1. Hints are not serialized;
2. Hints are not cloned.

Additionally, hints cannot be considered key or crucial to the data of a Geometry or to algorithms operating on the geometry—they only provide simple hints to improve performance.

3.3 Detail

Different levels of detail may be generated from the same model. A balance may be struck between the level of detail and frame rate. A uniform frame rate mechanism is used in one or more embodiments of the invention to determine an appropriate level of detail. A mote detailed discussion is provided herein in the section entitled "Achieving Uniform Frame Rates."

4 Applications

MetaModel 3D Object Technology's power can be exploited in several key ways:

Modeling
Data size
Dynamic manipulation
Interpolator key snapshots
Level of detail snapshots
Dynamic and automatic level of detail adaptation 4.1 Modeling MetaModels provide a simple and concise way of describing complex geometric objects. Coupled with good IDE tools or even a simple scripting interface, it will be possible to create very complex models without purchasing a third party 3D geometry modeling system.

4.2 Data Size

MetaModel objects are much smaller tan their traditional counterparts. Models are described from a graph structure representing the operations used to construct the object instead of explicitly stating all of the points, colors, normals, and texture coordinates and how these components are interconnected.

MetaModel objects are traditionally in the order of 3–5 Kilobytes in size, regardless of the amount of detail in the object. Traditional 3D models can require orders of magnitude more data to describe the same amount of detail.

4.3 Dynamic Manipulation

MetaModel objects have exposable parameters that allow parts of the construction graph to be modified at run-time while the model is being displayed by a renderer. The model can bend, twist, flex—or completely change. Existing interactive 3D graphics interfaces are built on a foundation of static, rigid models.

4.4 Interpolator Key Snapshots

A common feature of high-level interactive 3D programming interfaces is to provide a facility for interpolating between snapshots of a 3D object to perform a static "canned" animation. Unfortunately, traditional three-dimensional models can be large by themselves: sending multiple snapshots that vary in subtle ways can tax the network bandwidth and patience of the audience.

MetaModel objects facilitate this by allowing the rendering system to calculate the snapshots at runtime. A single 3–5K MetaModel object can dynamically calculate three or four different snapshots.

4.5 Level of Detail Snapshots

Another common feature of high-level interactive 3D programming interfaces is to provide multiple snapshots of the same 3D object with varying levels of detail. This is most commonly used as an aid to improve the performance of the rendering system. When an object is far away, there is no need to render as many polygons; the version with fewer polygons can be swapped in. When an object is very close, a version with more polygons can be swapped in.

Using traditional 3D object deployment methods, every level of detail needs to be transmitted across the network to the client for rendering. With MetaModels, however, the server only needs to ship a single 3–5K MetaModel object, and the client software can have the MetaModel calculate three or four levels of detail at runtime.

4.6 Dynamic and Intelligent Level of Detail Adaptation

One of the most compelling motivations for using MetaModel 3D Object Technology is the ability for individual 3D models to dynamically and intelligently modify themselves to respond to levels of performance being achieved by the renders system.

In other words, each MetaModel object can monitor the rendering system for its current levels of performance. If certain minimal frame rate thresholds are violated, for example, a MetaModel could dynamically reduce its own polygon count by a small amount to improve rendering performance. A whole scene of MetaModel objects can work collectively to ensure that a virtual reality simulation consistently provides an acceptable quality of service.

Content developers will degrade the quality of their work to the lowest common denominator because of the vast disparity in 3D performance from computer to computer. MetaModels have the ability to adapt dynamically—this hides the hardware performance requirements from the content developer.

5 Architectural Building Blocks

In its Java implementation, a set of Java classes have been designed to make up the fundamental architectural which is MetaModel 3D Object Technology. They can be roughly grouped into the geometry classes, the core classes and the operation classes. The Geometry Classes provide basic optimized 3D geometry support. The core classes consist of the classes that give MetaModels their intelligence and basic ability to manage and build themselves. The operation classes are the satellite classes that perform specific modeling operations.

5.1 Geometry Classes

The Geometry classes provide containers for describing raw three-dimensional data in a way that is optimized for MetaModels. These classes include specific performance enhancement structures. There are several major subsystems that comprise the MetaModel library:

1. Geometry classes
2. Core classes
3. MetaModel operations
4. Object Players

5.1.1 Geometry

The Geometry class contains the actual geometric data in a standardized form. It contains the coordinate, color, normal and texture coordinate data as well as how it all connects to form faces in a three-dimensional universe. Geometry is easily and quickly convertible to other specific API's such as Java3D and VRML. The Geometry object allows data to be shared by describing faces as lists of indices into the data pools.

Geometry data refers to one of the coord, color, normal or texCoord arrays, and geometry dataIndex refers to one of the coord Index, colorIndex, normalIndex or texCoordIndex arrays for example.

One of the aspects of Geometry that will be fully exploited in the MetaModel architecture is the ability for two Geometry objects to share the same array (a coord array for example). This is possible because Geometry makes public all of its data and index arrays. It was felt that violating object-orientated encapsulation principles was necessary for the MetaModel mechanism and various geometric algorithms to function at an acceptable level of performance.

There is a set of laws governing the sharing of Geometry arrays which must be carefully adhered to in order to avoid unnecessary bugs and problems in the MetaModel development phase. In a nutshell, in general developers will want to reference parts of source Geometry data as much as possible. However, if any of the data needs to be modified, the developer must first clone the data and operation only on the clone. Modifying data from a source Geometry violates this design.

Another interesting feature of Geometry is the ability to add and remove hints from the Geometry. Hints are basically a hash map of key-value pairs that describe additional properties of Geometry. There are two axioms governing the use of hints in a Geometry object:

1. Hints can only describe values that are attainable directly from the Geometric data, and
2. Hints are not serialized.

The main purpose of Geometry hints is for performance enhancements. For example, the Connectivity of the coord data can be added to Geometry as a hint, which allows the Connectivity to be reused without recreating it from scratch. Similarly, the Geometry can contain a hint that states that the Geometry is in a triangulated state, which if observed means the observer doesn't have to iterate over all of the faces in the geometry to confirm that they have three sides.

In MetaModel 3D Object Technology, hints will be used aggressively to optimize common operation combinations.

It is also important to note that hints can easily become obsolete and incorrect, and it is the responsibility of the user of the Geometry to avoid reckless hint use.

5.1.2 Connectivity

Connectivity is a utility object that has the ability to quickly respond to the following question: Given the index of a coordinate, color, normal or texture coordinate, which faces are attached to that coordinate.

This information is critical in many surface-based geometry operations, and is not efficiently attainable in the Geometry data structure alone.

Connectivity provides methods for retrieving the connectivity information. It also acts as a pseudo-decorator for setting and modifying data in the Geometry. It is critical to use the Connectivity decorator if you plan on making modifications to the Geometry, otherwise the Connectivity data will become out-of-date and unusable.

5.1.3 GeometryDataInException

The Connectivity object throws this exception when you try to remove a data element that has attached faces. For example, if you try to remove coord at index 4 while faces 3, 6, and 10 contain references to the coord at index 4, then the exception will be throw. GeometryDataInUseException extends RuntimeException.

5.1.4 InvalidGeometryException

There are two methods in Geometry used to check the validity of the Geometry object:
void checkBasicValidity( );
void checkCompleteValidity( );

Both methods simply analyze the data in the Geometry structure and throw an exception if any of the Geometry validity rules have been violated.

The rules governing basic validity are:

1. None of the data or dataIndex arrays can be null, and
2. All of the dataIndex arrays must be the same size.

The rules governing complete validity are:

1. The conditions of basic validity have been met, and
2. No dataIndex elements should refer to a null or out-of-bounds data element.

Basic validity is a very inexpensive check. Complete validity is a very expensive check. These functions are very useful when developing and debugging. Complete validity should not normally be called directly in production code InvalidGeometryException can also be thrown at any time during the course of an algorithm's execution (by a MetaModel operation subclass, for example) if it encounters a condition that violates Geometry validity. This can be added to production code: User-interfaces sitting on top of MetaModel libraries should be aware that this exception can be thrown and must handle it elegantly.

5.2 The Core Classes

The core classes house the administrative functionality for MetaModels.

5.2.1 CyclicGraphException

Figure 8:
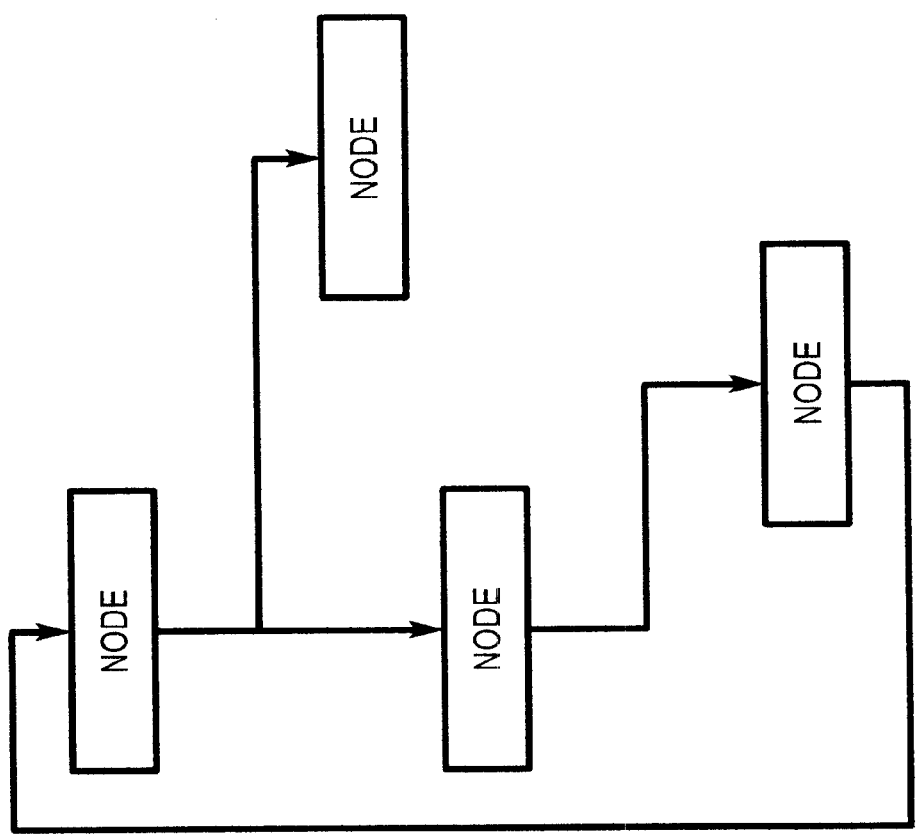
FIG. 8 is a diagram depicting a MetaModel graph that, when executed, would throw a CyclicGraphException.

FIG. 8 shows a diagram depicting a MetaModel graph that, when exceed, would throw a CyclicGraphException. This exception is raised whenever a cycle in a MetaModel graph is detected. This occurs when the output of one MetaModel operation eventually leads back to one of its inputs. The following diagram gives a graphic representation of a graph cycle:

5.2.2 MetaModel operation

This class is the base class for all of the MetaModel operations, and provides the basic administrative functionality allowing MetaModel graphs to be constructed and for the individual operations to communicate with each other intelligently.

MetaModel operations are the basic building blocks for MetaModel 3D Objects. Every MetaModel operation JavaBean has a property called "geometry" which is the result of executing the operation.

A MetaModel operation can have zero or more properties that are themselves MetaModel operations. These properties are called the inputs of the MetaModel operation, and are the mechanism for building MetaModel operation graphs.

MetaModel operations that have no MetaModel operation inputs are called generators. All other MetaModel operations have one or more input MetaModel operation from which a new Geometry is constructed.

EllipseGenerator and GridGenerator are two MetaModel operations that have no MetaModel operation input properties. In other words, they do not operate on existing Geometric data; they simply generate new data from scratch.

CopyOperation has a single input called source and is therefore not referred to as a Generator. Likewise, ExtrudeOperation has two inputs and is not referred to as a Generator, a Geometry representing the cross section of the extrusion, and a Geometry representing the path of the extrusion.

It is recommended that these naming conventions be followed when the MetaModel libraries are extended.

MetaModel operations can have any number of other properties that affect the output of the MetaModel. For example, CopyOperation has an int property to tell the operation how many copies to construct, and a Matrix4f property to tell the operation how to transform each copy.

MetaModel operations have a method called generate( ) which constructs the output Geometry for the operation. There are a number of rules governing exactly how generate should create its output geometry.

The class has an unbound property called changes which is an int bitmask representing all of the changes which have been made to the output Geometry since the last time generate has been called.

5.2.3 NoSuchInputException

This exception is thrown by the getInput(String) method of MetaModel operation which allows MetaModel inputs to be extracted by name. An input is a property of a MetaModel operation which is itself of type MetaModel operation.

5.2.4 OperationChangeEvent

A MetaModel operation fires these JavaBean events when any bound properties of the operation have been modified, including any of its MetaModel operation inputs.

OperationChangeEvents are different from regular PropertyChangeEvents because they are generally repeatedly fired through a MetaModel operation graph hierarchy and they keep track of the originator of the change. This is used primarily to detect cycles in the operation graphs.

5.2.5 OperationChangeListeners

Any parties interest in knowing that a MetaModel operation has changed in some way implements this interface. MetaModel operations are themselves OperationChangeListeners because they must listen for OperationChanges in all of their MetaModel operation inputs.

5.2.6 OperationExecutionException

If an exception occurs inside the generate( ) method of a MetaModel operation, it is caught and re-thrown bundled inside a OperationExecutionException. The generate( ) would catch all known exceptions and re-throw them bundled inside an OperationExecutionException.

When thrown, OperationExecutionException indicates that the MetaModel operation could not properly execute to generate an output geometry.

5.3 The MetaModel Operation Classes

In one or more embodiments, operation classes are divided into two main groups: the generators, and the operations. The following provides examples of operations. Other operations may be used to supplement or replace those operations identified below.

5.3.1 Generators

Generators are the classification of MetaModel operations that have no MetaModel operation properties (inputs).

5.3.1.1 EllipseGenerator

| Property Name | Property Type | Description |
| --- | --- | --- |
| xSize | float | The width of the ellipse in the x-direction |
| ySize | float | The height of the ellipse in the y-direction |
| numSegments | int | The number of segments used to approximate the ellipse |

EllipseGenerator generates an Ellipse in the XY plane with the given x- and y-dimensions. The ellipse is actually a polygon with numSegments sides approximating the ellipse.

5.3.1.2 GridGenerator

| Property Name | Property Type | Description |
| --- | --- | --- |
| xDimension | int | The number of grid elements in-the-x-direction |
| yDimension | int | The number of grid elements in the y-direction |
| xSpacing | float | The space between grid elements in the x-direction |
| ySpacing | float | The space between grid elements in the y-direction |
| triangulate | boolean | True if the output grid should be triangulated, false if it should remain as rectangles |

GridGenerator generates a uniform rectangular grid on the XY plane.

5.3.2 Operations

5.3.2.1 ColorMappingOperation

| Property Name | Property Type | Description |
| --- | --- | --- |
| colorSource | MetaModel operation | The source of colors which will be applied to the input Geometry |
| input | MetaModel operation | The input Geometry which will have operation color data applied to it |

Takes the colors from a colorSource Geometry and applies them to a second input Geometry. If the resultant geometry has more faces (or vertices for a given face) than the colorSource, the values wrap around.

5.3.2.2 CoordinateToColorOperation

| Property Name | Property Type | Description |
| --- | --- | --- |
| input | MetaModel operation | The Geometry to convert operation |
| rScale | float | The scaling factor for the red value |
| gScale | float | The scaling factor for the green value |
| bScale | float | The scaling factor for the blue value |

Converts a Geometry to a set of color values. It does by taking the input geometry and replacing its color values with the coordinate values (scaled by the appropriate amount.) For example, if scale is 0.5:

Point (2, 0.8, 1.3) becomes Color (1, 4, 0.65)

Point (3, −7, 1) becomes Color (1, 0, 0.5) (Note clamping at 0 and 1)

This operation would be useful if you had some elegant way of calculating points, and wanted to convert them to colors. You could then use ColorMappingOperation to attach those colors to another geometry.

5.3.2.3 CoordinateToTextureOperation

| Property Name | Property Type | Description |
| --- | --- | --- |
| input | MetaModel operation | The input operation on which to convert coordinates to texture coordinates |
| sVector | Vector3f | The s component of the basis vector of the projection plane |
| tVector | Vector3f | The t component of the basis vector of the projection plane |

Converts a Geometry to a set of texture coordinate values. It does by taking the input geometry and replacing its texture coordinate values with the coordinate values (projected on to the passed in plane). For example, if the plane is the XZ axis:

Point (2, 0.8, 1.3) becomes Texture Coord (2, 0, 1.3)

Point (3, −7, 1) becomes Texture Coord (3 0. 1)

This operation would be useful if you had some elegant way of calculating points, and wanted to convert them to texture coords. You could then use TextureMappingOperation to attach those texCoords to another geometry.

5.3.2.4 CopyOperation

| Property Name | Property Type | Description |
| --- | --- | --- |
| input | MetaModel operation | The source object to be copied |
| matrix | Matrix4f | The transformation to transform each copy |
| copies | int | The number of copies to create |

The TransformOperation operation takes an input geometry and a transformation and applies the transformation to the geometry.

Scale, rotation and translation are applied independently of each other. That is:

Rotation is performed about the vector given before any scale or translation takes place;

Scale is applied by factoring out the scale component of any rotation and then applies the scale;

Translation is applied after all other operations.

5.3.2.5 ExplodeOperation

| Property Name | Property Type | Description |
| --- | --- | --- |
| target | int | One of COORD, COLOR, NORMAL,TEX-COORD. Describes the Geometry part that will be exploded |

The ExplodeOperation explodes geometry data-making previous shared coordinate, color, normal or texture coordinate data unshared. ExplodeOperation performs the opposite function of FuseOperation.

5.3.2.6 ExtrudeOperation

| Property Name | Property Type | Description |
|---|---|---|
| spine | MetaModel operation | |
| input | MetaModel operation | |
| matrix | Matrix4f | |
| startCap | boolean | |
| endCap | boolean | |

ExtrudeOperation takes a 2-D Cross section, a 3D spine and a transformation. The Cross section is first transformed by the transformation then a copy is translated by the first spine point. The cross sections are joined together or "skinned".

5.3.2.7 FuseOperation

| Property Name | Property Type | Description |
|---|---|---|
| input | MetaModel operation | |
| radius | float | |
| target | int | |

The FuseOperation fuses geometry data that are in close proximity to each other. A spherical radius around a point defines the proximity. Each point in the geometry is traversed, and "close" points are searched for. If any close points are found, they are removed and any faces that used those points are modified to point to the original point.

5.3.2.8 MergeOperation

| Property Name | Property Type | Description |
|---|---|---|
| inputA | MetaModel operation | |
| inputB | MetaModel operation | |

5.3.2.9 Model Operation

| Property Name | Property Type | Description |
|---|---|---|
| source | MetaModel operation | |

5.3.2.10 NormalMappingOperation

| Property Name | Property Type | Description |
|---|---|---|
| input | MetaModel operation | |
| normalSource | MetaModel operation | |

NormalMappingOperation is a MetaModel Operation that takes the normals from one Geometry and applies them to the second geometry and returns the result. If the resultant geometry has more faces (or vertices for a given face) than the normals source, the values wrap around.

5.3.2.11 SkinOperation

| Property Name | Property Type | Description |
|---|---|---|
| input | MetaModel operation | |
| startCap | boolean | |
| endCap | boolean | |
| uClosure | boolean | |
| vClosure | boolean | |

SkinOperation operation takes an input geometry (and a bunch of booleans that indicate how to deal with the start and end) and adds a skin to the outside. It does this by joining each face to the next face with a skin.

5.3.2.12 TextureCoordinateMappingOperation

| Property Name | Property Type | Description |
|---|---|---|
| input | MetaModel operation | |
| textureSource | MetaModel operation | |

A MetaModel Operation that takes the texture coordinates from one Geometry and applies them to the second geometry and returns the result. If the resultant geometry has more faces (or vertices for a given face) than the texCoordSource, the values wrap around.

5.3.2.13 TransformOperation

| Property Name | Property Type | Description |
|---|---|---|
| input | MetaModel operation | |
| matrix | Matrix4f | |

The TransformOperation operation an input geometry and a transformation and applies the transformation to the geometry Scale, rotation and translation are applied independently of each other. That is:

Rotation is performed about the vector given before any scale or translation takes place.

Scale is applied by factoring out the scale component of any rotation and then applies the scale Translation is applied after all other operations.

5.3.2.14 TriangulateOperation

| Property Name | Property Type | Description |
|---|---|---|
| input | MetaModel operation | |

Decomposes the faces of the input geometry into triangles.

5.3.3 Additional MetaModel Operations

The above-described MetaModel operations by no means define an exhaustive set. Other operations may be included such as the following:

ArcGenerator—Generate an elliptical arc-segment. This functionality of this generator could be combined with EllipseGenerator.

BendOperation—Bend a geometry around a vector or axis.

BoxGenerator—Generate a 6-sided box.

CenterOperation—Center a geometry around a particular point in space.

ClipOperation—Clip a geometry on one side or a plane or inside a particular closed geometry.

CylinderTextureMapOperation—Map texture coordinates to a geometry by placing an imaginary cylinder around the geometry and projecting texture coordinates inward.

ExtractFacesOperation—Extract particular faces from a Geometry.

ExtractVerticesOperation—Extract particular vertices from a Geometry

GsphereGenerator—Generate a geodysic sphere.

LsphereGenerator—Generate a latitudinal/longitudinal sphere.

OrientOperation—Rotates a geometry to match the rotation of a particular face.

PlaneTextuxeMapOperation—Map textue coordinate to a geometry by placing an imaginary plan in front of the geometry and projecting texture coordinates toward the geometry.

ReadOperation—Read geometric information from a URL.

SortPolygonOperation—Sort polygons in a Geometry.

SortVertexOperation—Sort vertices in a Geometry.

SphericalTextureOperation—Map texture coordinates to a geometry by placing an sphere around the geometry and projecting texture coordinate inwards onto the geometry.

SplineOpeation—Subdivide polygons in a geometry using a spline interpolant (probably cubic).

SplitOperation—Split polygonal segments in a geometry into a number of equal parts.

StrecthOperation—Stretch or squash a geometry.

TextOperation—Generation text characters in a particular size and font.

TwistOperation—Twist an input geometry around an axis vector.

5.3.4 Object Players

The object player provides an interface between the MetaModel and the underlying rendering system. The object player may further include a uniform frame rate mechanism which is described in more detail below.

6 Achieving Uniform Frame Rates

The following describes a technique for helping achieve uniform frame rates in complex interactive three-dimensional virtual environments. The technique relies on the ability for a geometry engine to produce varying levels of detail for individual objects and for the rendering engine to retain statistical information about rendering times for groups of objects.

6.1 Introduction

The use of three-dimensional graphics is in the process of reaching the mass-market. Very high performance technology has already infiltrated the gaming markets in machines such as the Nintendo 64, Sega Genesis and most recently the Sega DreamCast. On home PC's games such as Quake and Tomb Raider (The Adventures of Lara Croft) are extremely popular—and have the ability to run on machines with or without powerful 3D graphics video cards which can boost performance many orders of magnitude.

The major problem with trying to deploy content (such as games) to the wide variety of platform performance metrics is striking an even balance. How does one retain enough market share (by including older machines with less performance) and still push the limits of technology (by creating astounding real-time experiences on the newer better-equipped hardware)?

By including a lot of detail (too many polygons or textures) in an interactive three-dimension virtual environment, the frame rates become slower and jerky which greatly disrupt the interactive experience. However, the same problem occurs if you don't include enough detail—suddenly object's look blocky and unrealistic and the user is equally unable to suspend reality and get the full enjoyment out of the virtual environment.

Many factors combine to affect the performance of an interactive three-dimensional virtual simulation: the number of objects in the scene, the position, orientation and behavior of the objects in the scene, the shape of the objects in the scene, the position of the viewer, the quality of other optimization system such as culling algorithms, and much more. The problems are compounded by the fact that the entire system is interactive (meaning the viewer generally decides where he or she wants to go) and inherently unpredictable. In the best case, this means an interactive environment must be tuned to satisfy the rendering constraints of a particular hardware platform and becomes difficult to port to other systems. In the worst case, this means that the rendering system will generate non-uniform frame rates (sometimes very slow, other times fast) that inevitably destroy the subversive experience they are trying to create.

The solutions presented in this paper show how parametric three-dimensional surfaces can be combined with an adaptive level-of-detail management system to provide predictable and uniform frame rates across a wide variety of hardware and software platforms.

6.2 Previous Work

A number of efforts have been implemented in the past to attempt to improve rendering performance in three-dimensional environments. Previous works discussed herein are listed [1] and [2] in "6.11 References".

6.3 Culling

This area is one of the most widely researched and most effectively implemented methods for maximizing performance out of a rendering system. All of the methods listed here have the basic goal of easily determining which polygons are not visible and not rendering them.

6.3.1 View Frustum Culling

This technique, pioneered early in the field of three-dimensional graphics involved determining which polygons lay outside the visible viewing volume (or view frustum) and not rendering those polygons. View Frustum Culling is typically built into most rendering subsystems like OpenGL and Direct3D.

6.3.2 Backface Culling

This method, also built into most common rendering systems involved describing polygons as one-sided, and only rendering polygons which fed the viewer. A sphere viewed from any angle, for example, will have half of its polygons facing away from the viewer, and thus they can quickly be discarded and not rendered.

6.3.3 Cells and Portals

The Cells and Portals technique is common in the game industry in environments where the player is navigating through a series of rooms (cells) connected by doors (portals). Using the technique exploits assumptions which can be made in this constrained environment.

6.3.4 BSP Trees

BSP (Binary Spatial Partition) Trees were popularized by the designers at Id Software in their first-person three-dimensional games Wolvenstein 3D, Doom and Quake. The technique partitions wall, floors and ceilings into a binary tree that can be quickly traversed to build visibility sets.

6.4 Level of Detail

Level-of-detail (LOD) (also known as detail elision), first described by Clark [2], is a way of reducing the number of polygons being rendered by describing objects as a series of objects with similar structure but decreasing detail. One of these "levels" is used to represent the object at any particular moment in time. A static heuristic is used to select which LOD is to be used for rendering. The static heuristic is normally based on some threshold regarding the size or distance of the object from the viewer or the number of pixels covered by an average polygon in the object.

6.5 Adaptive Level of Detail

An evolution of the LOD method used in many flight simulators today—modifies the LOD threshold parameters depending on the historical performance results of the rendering systems and a desired frame rate. For example, if the rendering system was falling below a desired frame rate of 20 frames per second, then the rendering system could scale the distance threshold values of the LOD object so that a smaller version of the object is rendered.

According to Funkhouser and Sequin [1], this technique is effective in environments like flight simulators where there is a large amount of coherence in scene complexity from frame to frame, but is not as effective in more discontinuous complex virtual environments. They point out another important issue as well: this be of system is reactive rather than predictive, which means that action will not be taken to correct deviations from the desired frame rate until the desired frame rate is compromised.

6.6 Adaptive Display

Funkhouser and Sequin [1] describe a technique to guarantee a bounded frame rate that is predictive rather than reactive, and their methods are used by state-of-the-art simulation companies such as Division Ltd. The method is theoretically elegant, but suffers from a number of problems:

1. The method requires the rendering system to have full knowledge and control over the LOD of every object in the scene, and does not behave well when objects do not have enough levels of detail.
2. Because of the complexity of the calculations used to predict ideal object complexity, the rendering system requires detailed and very low-level information about how the graphics pipeline reacts to various inputs. Because of this, the solution is not easily ported across systems.
3. The motivation for using a predictive model over a reactive model is so that the system can behave well in situations where there is less coherence in object content from frame to frame. Unfortunately these benefits are lost in the algorithm that is used to actually select object detail; for purposes of efficiency, it relies on the fact that scenes typically have a fair amount of object coherence from frame to frame.

6.7 Overview of Approach

A purely predictive model is not possible in full generality on the wide range of systems and situations that can occur in the real world. Instead, we propose a hybrid predictive/reactive model that takes advantage of statistical information obtained—as objects are being rendered as well as the flexibility and power of parametric three-dimensional geometric surfaces.

6.8 The Predictive/Reactive Hybrid

The predictive/reactive rendering engine attempts to make predictions on ideal object detail for particular frames before rendering the frame by analyzing statistical rendering data that has occurred in the past. If the rendering system has a sufficient amount of object detail levels, then it becomes fairly easy to obtain uniform targeted frame rates in most situations. Over time, the standard deviation of the statistical data is reduced, which allows the prediction algorithm to better approach the ideal frame rate for a system of objects.

6.9 Parametric Three-Dimensional Geometric Surfaces

There are several historic difficulties in using LOD to shrink rendering times:

1. Creating multiple detail levels of the same object is difficult using traditional modeling systems.
2. Transmitting, loading and storing objects with multiple levels of detail is wasteful and expensive.

These problems are alleviated by using a method of storing, transmitting and modeling geometry called Parametric Three-Dimensional Geometric Surfaces (MetaModels) [3]. MetaModels solve the above problems by providing a procedural data-flow programming paradigm for building three-dimensional geometric surfaces as well as a mechanism for building the models at run-time rather than have the models be specified fully on disk or during transmission time across a network.

MetaModel objects store only the parameters and operations required to build the three-dimensional surface in its entirety. Because of this, huge volumes of three-dimensional data can be described in very small sets of data. Storing and transmitting these small building blocks is an order of magnitude simpler and more efficient than sending huge blocks of static 3D data. Furthermore, the data is more dynamic and can be modified on-the-fly at runtime to produce complex interactive animations which are difficult to achieve otherwise.

It is trivial to produce many levels of detail of individual MetaModel objects by transmitting different snapshots of the models construction parameters. For example, imagine that there exists a MetaModel object for describing a Sphere that has parameters latitude and longitude indicating the number of latitudinal and longitudinal segments used to construct the sphere. Obviously larger number implies a smoother, more detailed model. It is possible to send the following description:

Sphere {
  latitude {30,25,20,25,20,15,10,5,0}
  longitude {30,25,20,25,20,15,10,5,01}
}

Without an effective method for creating an adequate granularity of LOD object descriptions, any adaptive rendering solution which relies on LOD is doomed to failure. Parametric three-dimensional geometric surfaces (MetaModels) provide the ability to easily create many levels of detail for individual objects.

6.10 Adaptive Rendering Management

The adaptive rendering engine uses historical statistical information to make guesses on the time it will take to render objects at specific LOD and rendering algorithm.

This provides a large degree of flexibility for the system to be transplanted onto a totally different hardware configuration, and have the ability to effectively produce guaranteed uniform frame rates.

It is assumed that a scene being rendered is composed of a set of renderable objects S. For our purposes, we divide this set into two main groups: objects S0 in which we have no control over rendering attributes, and objects S1, in which we have control over rendering attributes via the LOD and the render algorithm.

The time required to render a particular frame is the sum of the time required to render S0 and the time required to render S1.

$$T = T0 + T1,$$

We assume that T0 (which is out of our control) will not drastically change from frame to frame.

Objects in the set S1 can adaptively change their rendering attributes (level of detail and rendering algorithm) to shrink or grow T1, such that T approaches the desired time to render a frame. In fact, ideally we wish to solve the following set of conditions:

maximize $\Sigma sB(X, L, R)$ for all objects $X$ in $S1$ subject to $\Sigma sC(X, L, R) \leq \max$ Where B(X,L,R) is some metric of the benefit of rendering object X at LOD L with rendering algorithm R, and C(X,L,R) is some metric for the cost of rendering object X at LOD L with rendering algorithm R, max is some desired cost threshold—for our purposes, we assume C(X,L,R) is the time required to render an object at the given parameters, and max is the total time required to render a frame.

However, since we have no control over the elements in the set S0, we can only maximize the following variation of the original equation:

$\Sigma sB(X, L, R)$

Furthermore, we must also assume that individual C(X, L,R) elements are not directly measurable. Generally speaking, it is not possible to accurately measure the time require to render object X at a particular LOD and rendering algorithm. Consider that we are striving to obtain a cross-platform solution, and some computer timing clocks measure time in milliseconds (there are 1000 milliseconds in a second). If you are trying to render at a uniform 20 frames per second, this leaves 500 milliseconds to render a single frame. If the renderer has the ability to render at least 501 objects in the scene, then one or more of the objects have a measured rendering the of 0 ms. In reality, we know that it takes time greater than 0 to render objects. In fact, as computer graphics hardware gets faster and faster, measuring the rendering time of individual complex three-dimensional surfaces will become even more difficult and error-prone.

However, it is possible to accurately measure the total time to render all objects in the scene-one must simply start timing before any objects are rendered and stop timing after all objects have been rendered. This is the time required to render a single frame in the scene. This figure is easily obtained from the rendering system and has the ability to be much more accurate than trying to measure rendering times of individual objects.

Using this value T, we can compare it to our maximum allowable cost max, knowing that we must satisfy:

$T = \Sigma sC(X, L, R) \leq \max$

Our goal, of course, is to maximize the sum of all object benefits in S1 by selecting ideal (L,R) configurations without violating the above inequality. Assume we have an adequate measurable method for determining the benefit of a particular object configuration (X, L, R) (the methods presented in [1] will suffice).

All of the adaptable objects in the scene individually retain averaged timing information (stored as high-precision double floating point numbers) and standard-deviations of the collected data.

The process performs in the following way. At the beginning of the rendering pass, we immediately note the time required to render the previous two frames, Tf-1, and Tf-2 and determine the difference:

$Tmod = Tf\text{-}1 - Tf\text{-}2$

There is a set of objects Smod that was modified on the previous frame in order to correct timing deficiencies, and Tmod is the net effect of applying these changes. Therefore we can revisit the changes which were made and amortize the net effect Tmod over all the affected objects to enhance the accuracy of their timing statistics.

Then by performing rendering passes, analyzing the target rendering time and making adjustments to the (L,R) configurations of appropriate objects in S1, you can collect statistics on the cost effect of making various changes, and progressively iterate as the VR simulation continues towards a uniform frame rate.

A cost of this approach is that frame rates will not be uniform or predictable in the beginning of a simulation, but will quickly begin to approach uniform and predictable rates as time passes. This caveat is seen as an acceptable price to pay for a portable and flexible system.

6.11 References

[1] Funkhouser, Thomas A., Sequin, Carlo H, "Adaptive Display Algorithm For Interactive Frame Rates During Visualization of Complex Virtual Environments", ACM SIGGraph, Computer Graphics Proceedings, Annual Conference Series, 1993.

[2] Clark, James H "Hierarchical Geometric Models for Visible Surface Algorithms", Communications of the ACM, 19, 10 (October 1976), 547–554.

7 Sample Pseudo-code

The following provides sample pseudo-code for use in one or more embodiments of the invention. The files included in this output is the rough source code which defines the architecture of the MetaModel technology.

7.1 Geometry.java

A storage structure which houses geometric data.

```
//
// (c) 1999 Novafex Software Limited
//
public class Geometry
    implements jave.io.Serializable
{
    private Point3f[][]  coord;
    private Color3f[][]  color;
    private Vector3f[][] normal;
    private TexCoord2f[] texCoord;
    private int[] coordIndex;
    private int[] colorIndex;
    private int[] normalIndex;
    private int[] texCoordIndex,
    private transient java.util.Hashtable hints;
    public Geometry( ) {
    }
    public void setCoord(Point3f[][] coord) { this.coord=
        coord;}
    public void setColor(Color3f[][] color) { this.color=
        color;}
    public void setNormal(Vector3f[][] normal) {
        this.normal=normal;}
    public void setTexCoord(TexCoord2f[][] texCoord) {
        this.texCoord=texCoord;}
    public void setCoordIndex(int[] coodIndex) {
        this coordIndex=coordIndex;
    }
    public void setColorIndex(int[] colorIndex) {
        this.colorIndex=colorIndex:
```

```java
}
public void setNormalIndex(int[] normalIndex) {
   this.normalIndex=normalIndex;
{
public void setTexCoordIndex(int[] texCoordindex) {
   this.texCoordIndex=texCoordIndex;
}
public Point3f[][] getCoord( ) { return this.coord; }
public Color3f[][] getColor ( ) { return this color, }
public Vector3f[][] getNormal( ) { return this.normal; }
public TexCoord2f[][] getTexCoord( ) { return this.texCoord; }
public int[] getCoordIndex( ) { return this.coordIndex; }
public int[] getColorIndex( ) { return this.colorIndex; }
public int[] getNormalIndex( ) { return this.normalIndex;
}
public int[] getTexCoordIndex( ) { return this.texCoordIndex:}
}
```

7.2 GeometryDiff.java
A storage structre which houses the log of changes which have occurred to geometic data.
```java
//
// (c) 1999 Novafex Software Limited
//
/**
*A GeometryDiff is a log of all of the changes which have
   occurred to a Geometry.
*They have the ability to describe changes individually to
   coord, color, normal,
*texCoord or face data. Changes be any of ADD, DELETE,
   CHANGE or
*COMPLEX.
*Note that the cliff does not store the content of the changes,
   only the scope of the *changes.
*/
public class GeometryDiff
{
   public static final int ADD=0;
   public static final int DELETE=1,
   public static final int CHANGE=2;
   public static final int COMPLEX=3;
   public static final int COORD_INDEX=0x01;
   public static final int COLOR_INDEX=0x02;
   public static final int NORMAL_INDEX=0x04;
   public static final int TEXCOORD_INDEX=0x08;
   public static final int ALL_INDEX=COORD_INDEX|COLOR_INDEX|NORMAL_INDEX|TEXCOORD INDEX;
   private AbstractList coord;
   private AbstractList color;
   private AbstractList normal;
   private AbstractList texCoord;
   private AbstractList face;
   public GeometryDiff( ) {
      this.coord=null;
      this.color=null;
      this.texCoord=null;
      this.face=null;
   }
   public AbstractList getCoord( ) { return this.coord;)
   public AbstracList getColor( ) { return this. color; }
   public AbstractList getNormal( ) { return this.normal; }
   public AbstractList getTexCoord( ) { return this.texCoord; }
   public AbstractList getFace( ) { return this.face;}
   public void setCoord(AbstractList coord) { this.coord=coord; }
   public void setColor(AstractList color) { this.color=color,}
   public void setNormal(AbtractList normal) {
      this.normal=normal;}
   public void setTexCoord(AbstractList texCoord) {
      this.texCoord=texCoord;
   }
/**
* @param operation one of ADD, REMOVE, CHANGE
* @param startIndex the startIndex of the operation
* @param length the length of the operation
*/
public void logCoord(int operation, int startIndex, int length) {
   if (this.coord==null) this.coord=new ArrayList( );
   this.coord.add(new int[] { operation, startIndex, length });
}
/**
* @param operation one of ADD, REMOVE, CHANGE
* @param startIndex the startIndex of the operation
* @param length the length of the operation
*/
public void logColor(int operation, int startIndex, int length) }
   if (this.color==null) this.color=new ArrayList( );
   this.color.add(new int[] { operation, startIndex, length });
/**
* @param operation one of ADD, REMOVE, CHANGE
* @param startIndex the startIndex of the operation
* @param length the length of the operation
*/
public void logNormal(int operation, int startIndex, int length){
   if (this.normal=null) this.normal=new ArrayList( );
   this.normal.add (new int[] { operation, startIndex, length });
}
/**
* @param operation one of ADD, REMOVE, CHANGE
* @param startIndex the startIndex of the operation
* @param length the length of the operation
*/
public void logTexCoord(int operation, int startIndex, int length) {
   if (this.texCoord==null) this.texCoord=new ArrayList( );
   this .texCoord.add (new int[] { operation, startIndex, length } );
}
/**
* @param operation one of ADD, REMOVE, CHANGE
* @param data bitmask of COORD_INDEX, COLOR_INDEX,
```

```
 * NORMAL_INDEX, TEXCOORD_INDEX
 * @param startIndex the startIndex of the operation
 * @param length the length of the operation
 */
public void logFace(int operation, int data, int startIndex,
    int length) {
    if (this.face==null) this.face=new ArrayList( );
    this.face.add (new int[] { operation, data, startIndex,
        length } );
    }
}
```

7.3 MetaModelOperationjava

A base class configured to determine what updates to perform.

```
//
// (c) 1999 Novafex Software Limited
//
public abstract class MetaModelOperation
    implements PropertyChange Listener, OperationChange-
        Listener
}
    protected Geometry geometry;
    protected boolean dirty=true;
    private Vector omListeners;
    private Vector propertyChangeEventQueue;
    /** Constructor */
    public MetaModelOperation( )
        this.dirty=true;
        this.propertyChangeEventQueue=new Vector( );
        // We listen to property change events so that we know
        // when to recalculate our output
        addPropertyChangeListener(this);
    }
    /**
    *Return all of the input operations for this MetaModel-
        Operation.
    *This method must be implemented by subclasses to do
        the right thing.
    */
    public abstract MetaModelOperation[] getAllInput
        Operations( );
    /**
    * Performs the geometry operation on the inputs
    * result in "output"
    */
    public void execute( ){
        if (!dirty) return;
        //first clone the vector of property change events
        //by copying it into an array
        //and flush the property change event queue
        //in a synchronized block so no other events
        // can be added between the two calls.
        PropertyChangeEvent[] propertyChanges=null;
        synchronized (this.propertyChangeEventQueue)
            //propertyChanges=
        (Vector)this.propertyChangeEventOueue.clone( );
        int queueSize=this.propertyChangeEventQueue.size( );
        propertyChanges=new PropertyChangeEvent
            [queueSize];
        this.propertyChangeEventQueue.copyInto
            (propertyChanges);
        this.propertyChangeEventQueue.removeAllElements
            ( );
        this.dirty=false;
    }
```

```
//loop through all of our inputs and call execute on them
//this decends through the graph ensuing everything is
//generated in a depth-fist manner
MetaModelOperation[] inputs=
    getAllInputOperations( );
if (inputs !=null)
    for (int i=0; i<inputs.length; i++)
        inputs[i].execute( );
}
}
//call the generate method with the cloned
//event queue. the generate method ensures that the
    geometry
// is up to date.
    generate(propertyChanges);
}
/**
* Execute the operation. This method is implemented in
* subclasses to actually generate a geometry and place
    the
* result in the geometry object.
*/
protected abstract void generate(PropertyChange
    Event[] evt);
public Geometry getGeometry( ) { return this . geom-
    etry; }
//
// methods to add, remove and fire property change
    events
//
public void addPropertyChangeListener
    (PropertyChangeListener pcl) {
    support.addPropertyChangeListener(pcl);
}
public void removePropertyChangeListener
    (PropertyChangeListener pcl)
}
    support.removePropertyChangeListener(pcl);
}
public void firePropertyChange(String propName,
    Object oldV, Object newV) {
    support.firePropertyChange(propName, oldV,
        newV);
}
/**
* Adds an operation modification listener to the listener
    list.
*/
public synchronized void addOperationChange
    Listener( OperationChangeListener oml) {
    if (omListeners==null) {omListeners=
        newjava.util.Vector( );
    }
    omListeners.addElement(oml);
}
/**
* Removes a operation modification listener from the
    listener list.
*/
public synchronized void removeOperation
    ChangeListener(
    OperationChangeListener oml) {
    if (omListeners !=null) {
        omListeners.removeElement(oml);
}
}
```

```
/**
 * Fires a operation modification event to all listeners.
 */
public void fireOperationChange(OperationChangeEvent
   evt)
{
   Vector targets=(Vector) omListeners.clone( );
   for (Enumeration e=targets.elements( );
      e.hasMoreElements( ); )
   {
      OperationChangeListener    target=
         (OperationChangeListener)e.nextElement( );
      target.operationChanged(evt);
   }
}
/**
 * Implement the OperationChangeListener interface so
 * we can cascade operation changes down to our
 * ultimate outputs. We listen to the operation changes
 * of all of our own MetaModelOperation inputs so we
 * known when changes have been made to them. This is
   also
 * where nodes in the graph are marked dirty.
 */
public void operationChanged(OperationChangeEvent
   evt) {
   this.dirty=true;
   if (evt.getSource( )==this) {
      throw new CyclicGraphException(
         "a graph cycle has been detected");
   }
   fireOperationChange(
      new OperationChangeEvent(evt.getSource( ), this));
}
/**
 * Implement the PropertyChangeListener interface so
 * we can respond to changes made to our properties.
 *
 * @param evt the property change event that was
   received.
 */
public void propetyChange(PropertyChangeEvent evt) {
   // one of my properties has changed, mark me dirty
   MetaModelOperation.this.dirty=true;
   // queue up the property change event so we can
   // look at it in the generate method
   MetaModelOperation.
      this.propertyChangeEventQueue.addElement(evt)
;
   // create the operation change event which will be
      cascaded
   // through the graph hierarchy (caught by the opera-
      tionChanged
   // method in operations listening to me)
   OperationChangeEvent modEvent=new
OperationChangeEvent(this, this);
   fireOperationChange(modEvent);
   }
}
```

7.4 OperationChangeEventjava
   An event that is fired when a node in a graph requests an update.
//
// (C) 1999 Novafex Software Limited
//

```
public class OperationChangeEvent
extends java.util.EventObject
{
   /**
    * The propagator of this event. Change events are
    * routed up the MetaModel Operation graph. A modifi-
      cation
    * to one operation will affect other operations higher in
      the
    * MetaModel operation graph. For the originator of the
      event,
    * this value is the same as "source".
    * <P>
    * Operations higher in the operation graph will set them-
      selves
    * as the router, and copy the source from the event they
      are
    * propagating.
    */
   protected transient Object router;
   /**
    * Create an OperationChangeEvent with the given source
      and
    * router.
    */
   public OperationChangeEvent(Object source, Object
      router) {
      super(source);
      this.router=router;
   }
   /**
    * Returns the router of this event
    */
   public Object getRouter( ) {
      return this.router;
   }
}
```

7.5 OperationChangeListener java
   An interface used to listen to nodes requesting updates.
//
// (c) 1999 Novafex Software Limited
//
/**
 * An "OperationChange" event gets fired whenever the
   output
 * of a MetaModelOperation needs to be updated—normally
   when someone changed
 * an attribute of the operation
 * <P>
 * You can register a OperationChangeListener with a
 * MetaModelOperation so as to be notified of any such
   updates. Since many
 * MetaModelOperation's take other Operations as input,
   they should be
 * OperationChangeListeners
 */

```
public interface OperationChangeListener
extends java.util.EventListener
{
  /**
   * This method is called when an operation has been
     modified
   */
   public abstract void operationChanged
     (OperationChangeEvent evt);
}
```

7.6 Implementation Examples

The following actual operation implementations are included as examples to illustrate how parts of the technology fit together:

7.6.EllipseGenerator.java

This example generates a simple 2d ellipse shape.

```
//,
// (c) 1999 Novafex Software Limited
//
/**
* This implements an EllipseGenerator modeling object.
* <P>
* An ellipse takes no input geometry and sets the output to
* an ellipse centered at the origin which is contained within
* the rectangle of the specfied size
* <P>
*If you want to create the geometry in java, here is an
   example:
* <P>
*<pre>
* EllipseGenerator=new EllipseGenerator( );
* e.setXSize(1.0f);
* e.setYSize(1.0f);
* e.setSegments(1.0f);
* Geometry geom=e.getGeometry( );
* </pre>
*/
public class EllipseGenerator
   extends MetaModelOperation
{
   public static final String XSize_PROPERTY="xSize";
   public static final String YSIZE_PROPERTY="ySize";
   public static final String NUMSEGS_PROPERTY=
      "numSegments";
   private float xSize;
   private float ySize;
   private int numSegments;
   */
   * Create a default version of this object
   */
   public EliipseGenerator( ) {
      this(1.0f, 1.0f, 10);
   }
   /**
   * Create an ellipse according to the specified parameters
   */
   public EllipseCenerator(float xSize, float ySize, int
      numSegments) {
      this.xSize=xsize;
      this.ySize=ysize;
      this.numSegments=numSegments;
   }
   //*
```

```
* Sets the size in the x-direction. The size must be
* non-negative, or the value will remain unchanged
*/
public void setXSize(float xSize)
   float oldValue=this.xSize;
   this.xSize=xSize;
      firePropertyChange(XSIZE_PROPERTY, new
         Float(oldValue),
         new Float(xsize));
}
/**
* Sets the size in the y-direction. The size must be
* non-negative, or the value will remain unchanged
*/
public void setYSize(float ysize){
   float oldValue=this.ysize;
   this.ySize=ySize;
      firePropertyChange(YSIZE_PROPERTY,
         new Float(oldValue),
         new Float(ySize));
}
* Sets the number of segments tha will compose this
   ellipse.
* The number of segments must be >=3, or the value will
   remain
* unchanged
*/
public void setNumSepments(int numSegments) {
   int oldValue=this.numSegments;
   this.numSegments=numSegments;
      firePropertyChange(NUMSEGS_PROPERTY,
         new Integer(oldValue),
         new Integer(numSegments));
}
/**
* Iniiializes the output geometry based on the set values
*/public Geometry generate(PropertyChange
   Event□□ evt) {
{
   Gemetry geom=getGeometry( );
   GeometryDiff myDiff=getGeometryDiff( );
   // for now my logged diff will be very dumb, simply
   // removing all elements and adding new elements.
   if (geom.get Coord( ) !=null)
   (myDiff.logCoord(DELETE, 0, geom.getCoord(
      ).length);
   }
   if (geom.getColor( ) !=null) {
   myDiff.logColor(DELETE, 0, geom.getColor(
      ).length);
   }
   if (geom.getNormal( ) !=null) {
   myDiff.logColor( )DELETE, 0. geom.getNormal(
      ).length).
   }
   if geom.getTexCoord( ) !=null) {
   myDiff.logColor(DELETE, 0, geom.getTexCoord(
      ).length;
   }
   if geom.getTexCoordIndex( ) !=null) {
   myDiff.logFace(DELETE, 0, geom.getCoordIndex(
      ).length;
   }
```

```
final float INCREMENT=2.0f* (float) Math.PI / (float)
    numSegments;
Point3f[] coord=new Point3f[numSegments];
TexCoord2f[] texCoord=new TexCoord2f
    [numSegments];
Vector3f[] norm=new Vector3f[numSegments];
Color3f[] color=new Color3f[numSegments],
int[] index=new int[numSegments];
for (int i=0; i < numSegments; i++) {
    float theta=INCREMENT * (float) i;
    float x=(float) Math.cos(theta) * xSize;
    float y=(float) Math.sin(theta) * ySize;
    textCoord[i]=new Point3f(x, y, 0.0f);
    textCoord[i]=new TexCoord2f(x, y);
    norm [i]=new Vector3f(0, 0, 1);
    color[i] =new Color3f(.8f, .8f, .8f);
    index[i]=i;
}
geom.setCoord(coord);
geom.setColor(color);
geom. setNormal(normal);
geom.setTexCoord(texCoord);
geom.setCoordIndex(new int[] { index });
myDiff.logCoord(ADD, 0, numSegments);
myDiff.logColor(ADD, 0, numSegments);
myDiff.logNormal(ADD, 0, numSegments);
myDiff.logTexCoord(ADD, 0, numSegments);
myDiff.logFace(ADD, 0, 1);
    }
}
7.6.2 CopyOperation java
    This example copies a geometry a number of times using
a transformation.
//
// (c) 1999 Novafex Software Limited
//
/**
 * The copy operation takes an input geometry, an integer
    representing
 * the number of copies and a transform to apply at each stage
    of
 * the copy operation.
 * <p>
 * An example of use of the CopyOperation operation is
    given as follows:
 * <pre>
 */
 * CopyOperaton copy=new CopyOperation( )
 * copy.setInput(cool(geometry);
 * copy.setTransform(transform);
 * Geomety geom=copy.getGeometry( );
 *</pre>
 */
public class CopyOperation extends MetaModelOperation
{
    private int copies;
    private.Matrix4f transform;
    private MetaModelOperation input;
    /**
    Create a default version of this object.
    */
    public CopyOperation( )
    super( );
    this.copies=1;
    this.transform=Matix4f.identity;
    this.input=null;
}
/**
 * Creates a CopyOperation operation
 */
public CopyOperation(MetaModelOperation input, int
    copies, Matrix4f transform)
this.input=input;
    this.copies=1;
    this transform=transform:
}
    public MetaModelOperation getInput( ) { return this.in-
        put;}
public int getCopies( ) { return this.copies;}
public Matix4f geTransform( ) { return this.transform; }
public void setInput(MetaModelOpeaton input) {
    MetaModelOperation oldvalue=this.input;
    this.input=input;
    firePropertyChange("input", oldValue, this.input);
}
public void setCopies(int copies) {
    int oldValue=this.copies;
    this.copies=copies;
    firepropertyChange("copies", new Integer(oldValue),
        new Integer(copies));
}
public void setTransform(Matrix4f transform) {
    Matrix4f oldvalue=this.transform;
    this.transform=transform;
    firePropertyChange("transform", oldValue, transform);
}
/**
 * Calculates the output geometry based on the input
 */
public Geometry generate(propertyChange
    Event[] changes) {
    if (this.copies <=0) return null;
    if (this.transform=null) return null;
    if (thisgetInput( )=null) return null;
    GeometryDiffinputDiff=this.getInput( ).getDiff( );
    //Note:
    //
    //At this point we can analyze inputDiff and changes to
    //.determine exactly what needs to be done to update this
    //CopyOperation's geomety data.
    // some handy aliases
    Geometry result=(Geometry)getGeometry( );
    GeometryDiff myDiff=getGeometryDiff( );
    MetaModelOperation input=getInput( );
    Geometry inputG=getInput,getGeometry( );
    int origNumCoords=inputG.getCoordIndex( ).length;
    int origNumFaces=inputG.getCoordIndex( ).length;
    Matrix4f currentTransform=new Matrix4f( );
    currentTransform.setIdentity( );
    Point3f newpoint=new Point3f( );
    // we need to build a diff database to imply what we have
        changed
    // during our of the geometry since the last time the
        geomety
    // was built
```

```
//
// if we are simply referencing a block of data from a
    previous
// geometry object, then we need to reference its cliff data
    in
// our cliff data
//
// otherwise, we need to be intelligent about what we are
    changing
// and only store data in the diff which accurately reflects
// the changes we are making
Point3f□□  coord=new Point3f[input.getCoord( ).length
    * copies];
Color3f□□  color=new Color3f[inputG.getColor( ).length
    * copies];
Vector3f□□ normal=new Vector3f[inputG.getNormal( ).
    length * copies];
TexCoord2f□□ texCoord=new TexCoord2f
    [inputG.getTexCoord( ).length * copies];
int□ coordIndex=new int□□[inputG.getCoordIndex( ).
    length * copies];
int□ colorIndex=new int□□[inputG.getColorIndex( ).
    length * copies];
int□ normaIndex=new int□□[inputG.getNormalIndex( ).
    length * copies];
into□ texCoordIndex=new it□□[inputG.getTex
    CoordIndex( ).length * copies];
for (int copyNo=0; copyNo < copies; copyNo++) {
    // build all of the coord, color, normal; texCoord
    // and *Index data in this loop
}
// log the changes we've made. in this simple example,
// we always change everything, so simply indicate that.
myDiff.logCoord(GeometryDiff.ADD, 0, coord.length);
myDiff.logColor (GeometryDiff.ADD, 0, color. length);
myDiff.logNormal(GeometryDiff.ADD, 0,
    normal.length);
myDiff.logTexCoord(GeometryDiff.ADD, 0,
    texCoord.length);
myDiff.logFace(GeometryDiff.ADD,
    GeometyDiff.ALL_INDEX,
0, coordIndex. length);
}
/**
* The dispose method is a Novafex ism used for disposing
    of
* the resoures of an object when you are finished with it
*/
public void dispose( ) {
super.dispose( );
}
/**
* Copies the contents of src to this object.
*
* @param the object to copy from
*/
public void copy(Object src) {
    if (!(src instance of CopyOperation)) {
        throw new IllegalArgumentexception(
            "cannot copy objects of difrerent type");
    }
    super.copy(src);
    CopyOperation obj=(CopyOperation) src;
    this.setCopies(obj.copies);
}
/**
* Return a human-readable String version of this object.
  @return a human-readable string representation of this
    object
*/
public String String( ) {
    return getClass( ).getName( ) + "["
        + "copies=" + copies + "," + "transform=u" +
        this.getMatrix( ) +"]";
}
}
```

What is claimed is:

1. A method of computer aided 3D modelling of geometric objects undergoing changes wherein a directed acyclic graph is executed to generate a 3D model by a computer system, the directed acyclic graph including a plurality of nodes which are connected each other with other nodes with directed edges between two nodes, each node representing a modelling operation of the geometric objects and each directed edge indicating the direction of flow of data from one node to another, comprising steps of:
  one of the plurality of nodes sending a change event indication specifying a type of change to at least one other node along an associated directed edge,
  upon receiving the change event indication, each of the receiving other nodes determining based on preset rules if the received change event indication will result in change in its output data, and
  each node in succession sending a further change event indication to succeeding nodes when it determines that the received change event indication will result in change in its output data.

2. The method of computer aided 3D modelling of geometric objects undergoing changes according to claim 1, wherein each node runs its own modelling operation in response to input data received from its preceding node and sends output data to its succeeding node, the method further comprising a step of:
  each node forwarding the change event indication to the succeeding node if the received change event indication is determined to affect its output data.

3. The method of computer aided 3D modelling of geometric objects undergoing changes according to claim 2, wherein a last node in the directed acyclic graph is an object player for instructing a rendering system to generate 3D modelling of geometric objects.

4. The method of computer aided 3D modelling of geometric objects undergoing changes according to claim 3, further comprising a step of:
  upon receiving the change event indication the object player determining if the directed acyclic graph is to be regenerated to reflect changes which the geometric objects are undergoing.

5. The method of computer aided 3D modelling of geometric objects undergoing changes according to claim 4, wherein a separate computer system containing the directed acyclic graph and a rendering system is located at a different location, and the method further comprises steps of:
  the object players of the two computer systems communicating through a communications path; and the object player at the different location instructing the rendering system at said different location to generate 3D modelling of geometric objects at said different location.

6. The method of computer aided 3D modelling of geometric objects undergoing changes according to claim 4, wherein there are more than one computer systems, each holding at least one node of the hierarchical graph, the method further comprises a step of:

upon receiving the change event indication the object player located in one of the computer systems determining if the directed acyclic graph is to be regenerated to reflect changes which the geometric objects are undergoing.

7. The method of computer aided 3D modelling of geometric objects undergoing changes according to claim 4, further comprising steps of setting any of the plurality of nodes into a batch mode in which each of the nodes in the batch mode send change event indication to succeeding nodes only when it is taken out of the batch mode.

8. The method of computer aided 3D modelling of geometric objects undergoing changes according to claim 4, further comprising steps of:

each node setting a semaphore when it has forwarded change event indication to its succeeding nodes, and the object player regenerating the directed acyclic graph by causing the nodes having a semaphore to update.

9. The method of computer aided 3D modelling of geometric objects undergoing changes according to claim 8, further comprising steps of:

queueing semaphores in a queue, and the object player regenerating the directed acyclic graph by updating the node in accordance with the semaphores stored in the queue.

10. The method of computer aided 3D modelling of geometric objects undergoing changes according to claim 9, further comprising steps of:

queueing semaphores in a plurality of queues in order to ensure orders and threads of semaphores, and the object player regenerating the directed acyclic graph by updating the node in accordance with the orders and heads of the semaphores stored in the queues.

11. The method of computer aided 3D modelling of geometric objects undergoing changes according to claim 10, further comprising steps of:

queueing semaphores in a plurality of queues in order to ensure orders and threads of semaphores, assigning a priority level to each thread of semaphores, and the object player regenerating the directed acyclic graph by updating the node in accordance with the orders and the priority of threads of the semaphores stored in the queues.

12. The method of computer aided 3D modelling of geometric objects undergoing changes according to claim 4, further comprising a step of:

the object player determining if the directed acyclic graph is to be regenerated to reflect changes which the geometric object are undergoing in response to capabilities and a level of performance of the rendering system.

13. The method of computer aided 3D modeling of geometric objects undergoing changes according to claim 4, further comprising a step of:

the object player determining based on any of the following criteria that the directed acyclic graph is to be regenerated to reflect changes which the geometric objects are undergoing, said critera including an elapsed time over a predetermined period of time, the number of change event indications being over a set figure.

14. The method of computer aided 3D modelling of geometric objects undergoing changes according to claim 5, further comprising steps of:

the object player determining if the directed acyclic graph is to be regenerated to reflect changes which the geometric objects are undergoing in response to capabilities and a level of performance of the rendering system.

15. The method of computer aided 3D modelling of geometric objects undergoing changes according to claim 5, wherein the object player determines based on any of the following criteria that the directed acyclic graph is to be regenerated to reflect changes which the geometric objects are undergoing, said criteria including an elapsed time over a predetermined period of time, the number of change event indications being over a set figure.

16. The method of computer aided 3D modelling of geometric objects undergoing changes according to claim 6, further comprising a step of:

the object player determining if the directed acyclic graph is to be regenerated to reflect changes which the geometric objects are undergoing in response to capabilities and a level of performance of the rendering system.

17. The method of computer aided 3D modelling of geometric objects undergoing changes according to claim 6, further comprising a step of:

the object player determining based on any of the following criteria that the directed acyclic graph is to be regenerated to reflect changes which the geometric objects are undergoing, said criteria including an elapsed time over a predetermined period of time, the number of change event indications being over a set figure.

18. The method of computer aided 3D modelling of geometric objects undergoing changes according to claim 1, wherein one or more nodes send different change event indication to other nodes through associated directed edges, the method further comprising a step of:

each node determining whether to forward its own change event indication in response to one or more different received change event indications.

19. The method of computer aided 3D modelling of geometric objects undergoing changes according to claim 18, further comprising steps of:

one or more nodes monitoring a current level of performance of the rendering system, modifying their bound properties to dynamically adapt to the level of the performance of the rendering system, and forwarding the change event indication to the succeeding node.

20. The method of computer aided 3D modelling of geometric objects undergoing changes according to claim 18, wherein each node rums its own modelling operation in response to input data received from its preceding node and sending output data to its succeeding node, and each node forwarding the change event indication to the succeeding node if the received change event indication is determined to affect its output data.

21. The method of computer aided 3D modelling of geometric objects undergoing changes according to claim 20, wherein a last node in the directed acyclic graph is an object player for instructing a rendering system to generate 3D modelling of geometric objects.

22. The method of computer aided 3D model of geometric objects undergoing changes according to claim 21, further comprising steps of:
the object player determining if the directed acyclic graph is to be regenerated to reflect changes which the geometric objects are undergoing in response to capabilities and a level of performance of the rendering system.

23. The method of computer aided 3D modelling of geometric objects undergoing changes according to claim 21, wherein the object player determines based on any of the following criteria that the directed acyclic graph is to be regenerated to reflect changes which the geometric objects are undergoing, said criteria including an elapsed time over a predetermined period of time, the number of change event indicatons being over a set figure.

24. The method of computer aided 3D modelling of geometric objects undergoing changes according to claim 1, wherein there are a plurality of directed acyclic graphs, each directed acyclic graph including a plurality of nodes which are connected with other nodes in a hierarchical tree with directed edges between two nodes, each node representing a modelling operation of the geometric objects and each directed edge indicating the direction of flow of data from one node to another, the method further comprising a step of:
one or more object players determining if any of the directed acyclic graphs are to be regenerated.

25. The method of computer aided 3D modelling of geometric objects undergoing changes according to claim 24, wherein each node in each of the plurality of hierarchical trees runs its own modeling operation in response to input data received from its preceding node and sending output data to its succeeding node, the method further comprising steps of:
each node forwarding the change event indication to the succeeding node if the received change event indication is determined to affect its output data, and
each object player for instructing a rendering system to generate 3D modelling of geometric objects.

26. The method of computer aided 3D modelling of geometric object undergoing changes according to claim 25, further comprising a step of putting any of the plurality of nodes into a batch mode in which each of the nodes in the batch mode send change event indication to succeeding nodes only when it is taken out of the batch mode.

27. The method of computer aided 3D modelling of geometric objects undergoing changes according to claim 26, further comprising a step of:
any of the object players determining if an associated directed acyclic graph is to be regenerated to reflect changes which the geometric objects are undergoing in response to capabilities and a level of performance of the rendering system.

28. The method of computer aided 3D modelling of geometric object undergoing changes according to claim 26, further comprising a step of:
any of the object players determining based on any of the following criteria that an associated directed acyclic graph is to be regenerated to reflect changes which the geometric objects are undergoing, said criteria including an elapsed time over a predetermined period of time, the number of change event indications being over a set figure.

29. The method of computer aided 3D modelling of geometric objects undergoing changes according to claim 25, further comprising steps of:
each node setting a semaphore when it has forwarded change event indication to its succeeding nodes, and
any of the object players regenerates an associated directed acyclic graph by causing the nodes having a semaphore to update.

30. The method of computer aided 3D modelling of geometric objects undergoing changes according to claim 29, further comprising steps of:
queueing semaphores in a queue and
any of the object players regenerating an associated directed acyclic graph by updating the node in accordance with the semaphores stored in the queue.

31. The method of computer aided 3D modelling of geometric objects undergoing changes according to claim 30, further comprising steps of:
queueing semaphores in a plurality of queues in order to ensure orders and threads of semaphores and
any of the object players regenerating an associated directed acyclic graph by updating the node in accordance with the orders and threads of the semaphores stored in the queues.

32. The method of computer aided 3D modelling of geometric objects undergoing changes according to claim 31, comprising steps of:
queueing semaphores in a plurality of queues in order to ensure orders and threads of semaphores,
assigning a priority level to each tread of semaphores and
any of the object players regenerating an associated directed acyclic graph by updating the node in accordance with the orders and the priority of threads of the semaphores stored in the queues.

33. A method of computer aided 3D modelling of geometric objects undergoing changes wherein a directed acyclic graph is executed to instruct a rendering system to generate a 3D model, the directed acyclic graph including a plurality of nodes which are connected with other nodes with directed edges between two nodes, each node resenting a modelling operation of the geometric objects and each directed edge indicating the direction of flow of data from one node to another, comprising steps of:
(a) executing continually the directed acyclic graph to instruct the rendering system to generate a series of frames of a 3D model of geometric objects which are undergoing changes,
(b) measuring a time required for the rendering system to generate a predetermined numbers of preceding frames with respect to a target time,
(c) modifying bound properties of one or more nodes, and
(d) repeating iteratively steps (b) and (c) so that the time required for the rendering system to generate the most recent frame approach the target time.

34. The method of computer aided 3D modeling of geometric objects undergoing changes according to claim 33, wherein each node runs its own modelling operation in response to input data received from its preceding node and sends output data to its succeeding node, the method further comprising a step of:
each node forwarding the change event indication to the succeeding node if the received change event indication is determined to affect its output data.

35. The method of computer aided 3D modelling of geometric objects undergoing changes according to claim 34, wherein a last node in the directed acyclic graph is an object player for instructing a rendering system to generate 3D modelling of geometric objects.

36. The method of computer aided 3D modelling of geometric objects undergoing changes according to claim 35, further comprising a step of:
    upon receiving the change event indication the object player determining if the directed acyclic graph is to be regenerated to reflect changes which the geometric objects are undergoing.

37. The method of computer aided 3D modelling of geometric objects undergoing changes according to claim 36, wherein a separate computer system containing the directed acyclic graph and a rendering system is located at a different location, and the method further comprises steps of:
    the object players of the two computer systems communicating through a communications path; and
    the object player at the different location instructing the rendering system at said different location to generate 3D modelling of geometric objects at said different location.

38. The method of computer aided 3D modelling of geometric objects undergoing changes according to claim 36, further comprising a step of:
    the object player determining if the directed acyclic graph is to be regenerated to reflect changes which the geometric objects are undergoing in response to capabilities and a level of performance of the rendering system.

39. The method of computer aided 3D modelling of geometric objects undergoing changes according to claim 36, further comprising a step of:
    the object player determining based on any of the following criteria that the directed acyclic graph is to be regenerated to reflect changes which the geometric objects are undergoing, said criteria including an elapsed time over a predetermined period of time, the number of change event indications being over a set figure.

40. A computer aided 3D modelling apparatus for modelling 3D model of geometric objects undergoing changes, comprising:
    an instruction storage module containing a directed acyclic graph to be executed to generate a 3D model, the directed acyclic graph including a plurality of nodes which are connected with other nodes with directed edges between two nodes, each node representing a modelling operation of the geometric objects and each directed edge indicating the direction of flow of data from one node to another,
    an input port for inputting changes in bound properties of one or more nodes,
    an instruction execution module for executing the directed acyclic graph to generate an output,
    an object player module for monitoring the output and regenerating the directed acyclic graph in response to the output if needed, and
    the rendering system for rendering the 3D model of geometric objects in response to the instructions.

41. The computer aided 3D modelling apparatus for modelling 3D model of geometric objects undergoing changes according to claim 40, wherein the object player module has monitoring mechanism for monitoring performance of the rendering system and adjusting the output according to the performance.

42. The computer aided 3D modelling apparatus for modeling 3D model of geometric objects undergoing changes according to claim 41, further comprising:
    a communications module for transmitting the output to a remote computer for rendering.

43. An apparatus for computer aided 3D modelling of geometric objects undergoing changes wherein a directed acyclic graph is executed to generate a 3D model, the directed acyclic graph including a plurality of nodes which are connected each other with other nodes in a hierarchical tree with directed edges between two nodes, each node representing a modelling operation of the geometric objects and each directed edge indicating the direction of flow of data from one node to another, comprising:
    means for sending a change event indication specifying changes to bound properties of the node to at least one other node in the hierarchical tree along associated directed edges,
    means for determining based on preset rules if the received change event indication affects its bound properties upon receiving the change event indication, and
    means for sending in succession a further change event indication to succeeding node when determined that the received change event indication affects its bound properties.

44. The apparatus for computer aided 3D modelling of geometric objects undergoing changes according to claim 43, further comprising means for rendering 3D modelling of geometric objects wherein a last node in the directed acyclic graph is an object player for instructing the means for rendering 3D modelling and for determining if the directed acyclic graph is to be regenerated to reflect changes which the geometric objects are undergoing.

45. The apparatus for computer aided 3D modelling of geometric objects undergoing changes according to claim 44, further comprising steps of:
    means for monitoring a current level of performance of the rendering system,
    modifying their bound properties to dynamically adapt to the level of the performance of the rendering system, and
    forwarding the change event indication to the succeeding node.

46. The apparatus for computer aided 3D modelling of geometric objects undergoing changes according to claim 45, further comprising:
    means for monitoring a current level of performance of the rendering system, and
    means for modifying their bound properties to dynamically adapt to the level of the performance of the rendering system.

47. A computer medium for computer aided 3D modelling of geometric objects undergoing changes, comprising;
    a storage module for storing a directed acyclic graph executable by a computer to generate a 3D model,
    the directed acyclic graph including a plurality of nodes which are connected each other with other nodes in a hierarchical tree with directed edges between two nodes, each node representing a modelling operation of the geometric objects and each directed edge indicating the direction of flow of data from one node to another,
    one of the plurality of nodes being adapted for sending a change event indication specifying changes to bound properties of the node to at least one other node in the hierarchical tree along associated directed edges, upon receiving the change event indication, each of the other nodes being adapted for determining based on preset rules if the received change event indication affects its bound properties, and each node being adapted for in succession sending a further change event indication to succeeding node when determining that the received change event indication affects its bound properties.

* * * * *